US008560235B2

(12) United States Patent
Okuyama et al.

(10) Patent No.: US 8,560,235 B2
(45) Date of Patent: Oct. 15, 2013

(54) APPARATUS AND METHOD FOR CALCULATING ABSOLUTE MOVEMENT PATH AND RECORDING MEDIUM

(75) Inventors: Kyouko Okuyama, Kawasaki (JP); Shinichiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 12/606,646

(22) Filed: Oct. 27, 2009

(65) Prior Publication Data

US 2010/0125414 A1 May 20, 2010

(30) Foreign Application Priority Data

Nov. 19, 2008 (JP) ................................. 2008-295292

(51) Int. Cl.
G01C 21/00 (2006.01)
(52) U.S. Cl.
USPC .......................................... 701/494; 701/400
(58) Field of Classification Search
USPC ........................................... 701/400, 494, 23
See application file for complete search history.

(56) References Cited

U.S. PATENT DOCUMENTS

| 5,828,987 | A | * | 10/1998 | Tano et al. ..................... 702/150 |
| 6,132,391 | A | | 10/2000 | Onari et al. |
| 6,204,807 | B1 | * | 3/2001 | Odagiri et al. ........... 342/357.57 |
| 6,826,478 | B2 | * | 11/2004 | Riewe et al. .................. 701/470 |
| 6,856,895 | B2 | * | 2/2005 | Hashida ........................ 701/446 |
| 2002/0080239 | A1 | * | 6/2002 | Ikeda et al. .................... 348/207 |
| 2004/0172838 | A1 | | 9/2004 | Satoh et al. |
| 2010/0085422 | A1 | * | 4/2010 | Yamashita et al. .............. 348/36 |
| 2010/0085442 | A1 | * | 4/2010 | Yamashita et al. ......... 348/222.1 |

FOREIGN PATENT DOCUMENTS

| JP | 3-118416 | 5/1991 |
| JP | 7-280575 | 10/1995 |
| JP | 8-233584 | 9/1996 |
| JP | 08-278137 | 10/1996 |
| JP | 09-089584 | 4/1997 |
| JP | 11-194033 | 7/1999 |
| JP | 2004-138513 | 5/2004 |
| JP | 2004-286732 | 10/2004 |
| JP | 2006-521601 | 9/2006 |
| JP | 2009-019979 | 1/2009 |
| JP | 2009-026056 | 2/2009 |
| WO | 2004/077374 | 9/2004 |

OTHER PUBLICATIONS

Japanese Office Action for Application No. 2008-295292 mailed Aug. 7, 2012.
Notification of Reason for Refusal, dispatched Nov. 20, 2012, in corresponding Japanese Application No. 2008-295292 (7 pp.).

* cited by examiner

Primary Examiner — Yonel Beaulieu
(74) Attorney, Agent, or Firm — Staas & Halsey LLP

(57) ABSTRACT

An absolute-movement-path calculating apparatus includes a direction acquiring part detecting a movement direction of the terminal at a given timing; a movement-distance calculating part calculating a movement distance of the terminal at the given timing; a relative-movement-path calculating part calculating a relative movement path based on the number of steps and a user's step length and storing the relative movement path; an absolute-position acquiring part acquiring an absolute position of the terminal, and storing the absolute position; and an absolute-movement-path calculating part calculating, each time the absolute positions are stored, a correction value from the relationship between at least two absolute positions and the relative positions corresponding to the absolute positions and calculating an absolute movement path of the terminal indicated by the absolute coordinate from the correction value and the relative movement path.

20 Claims, 38 Drawing Sheets

FIG. 5

| DATE AND TIME | NUMBER OF STEPS | AZIMUTH | COORDINATE VALUE x(m) | COORDINATE VALUE y(m) | GPS |
|---|---|---|---|---|---|
| 06/06/2008 10:30:01.489 | 1 | 90° | 0 | 0 | |
| 06/06/2008 10:30:01.992 | 2 | 90° | 0.7 | 0 | |
| 06/06/2008 10:30:02.499 | 3 | 90° | 1.4 | 0 | |
| 06/06/2008 10:30:02.987 | 4 | 90° | 2.1 | 0 | |
| 06/06/2008 10:30:03.478 | 5 | 90° | 2.8 | 0 | |
| 06/06/2008 10:30:03.991 | 6 | 90° | 3.5 | 0 | |
| 06/06/2008 10:30:04.480 | 7 | 90° | 4.2 | 0 | |
| 06/06/2008 10:30:04.987 | 8 | 90° | 4.9 | 0 | |

FIG. 6

| DATE AND TIME | NUMBER OF STEPS | AZIMUTH | COORDINATE VALUE x(m) | COORDINATE VALUE y(m) | GPS |
|---|---|---|---|---|---|
| 06/06/2008 10:30:01.489 | 1 | 90° | 0 | 0 | |
| 06/06/2008 10:30:01.992 | 2 | 90° | 0.7 | 0 | |
| 06/06/2008 10:30:02.499 | 3 | 90° | 1.4 | 0 | |
| 06/06/2008 10:30:02.987 | 4 | 90° | 2.1 | 0 | |
| 06/06/2008 10:30:03.478 | 5 | 90° | 2.8 | 0 | |
| 06/06/2008 10:30:03.991 | 6 | 90° | 3.5 | 0 | |
| 06/06/2008 10:30:04.480 | 7 | 90° | 4.2 | 0 | |
| 06/06/2008 10:30:04.987 | 8 | 90° | 4.9 | 0 | N35.58561 E139.6393 |

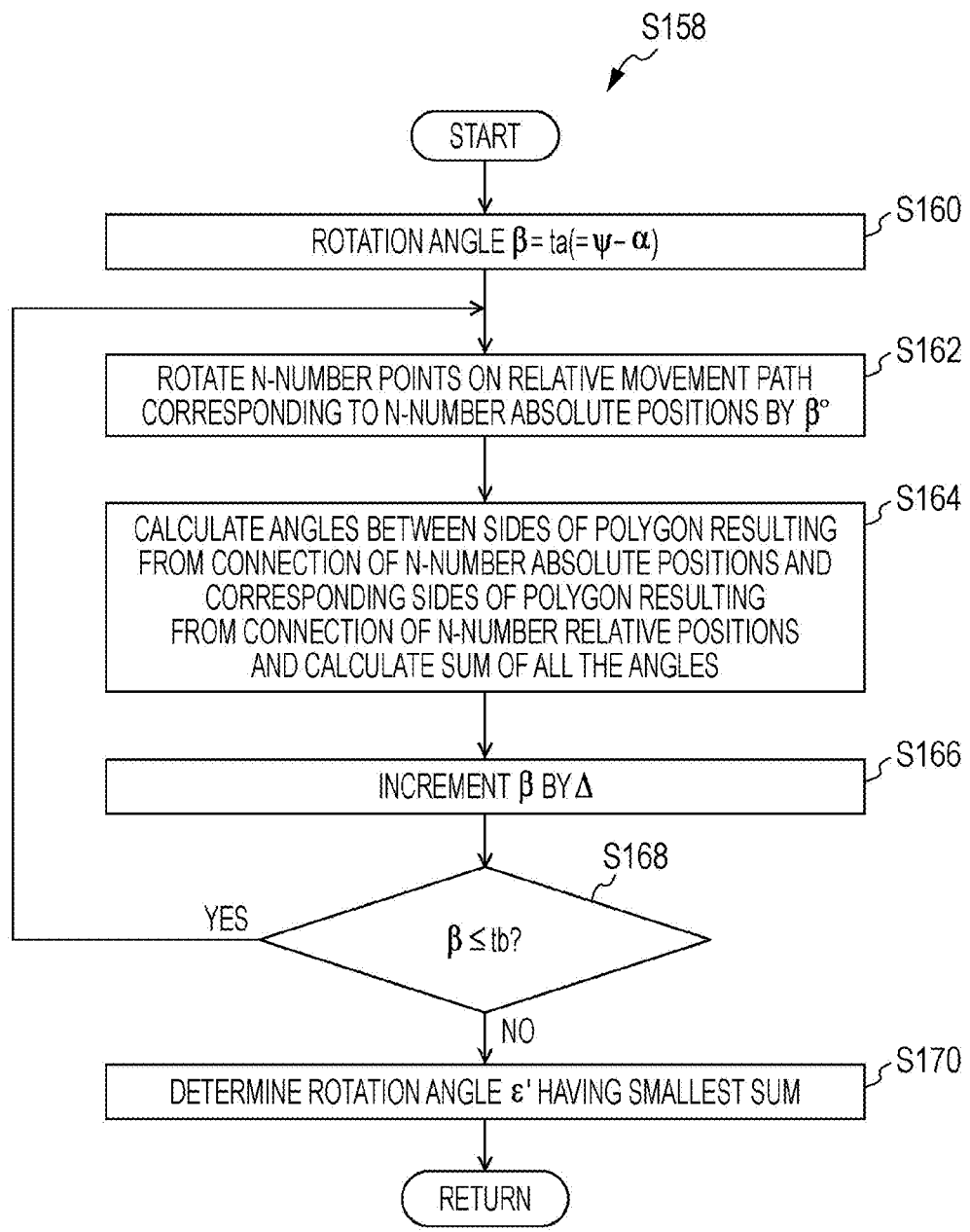

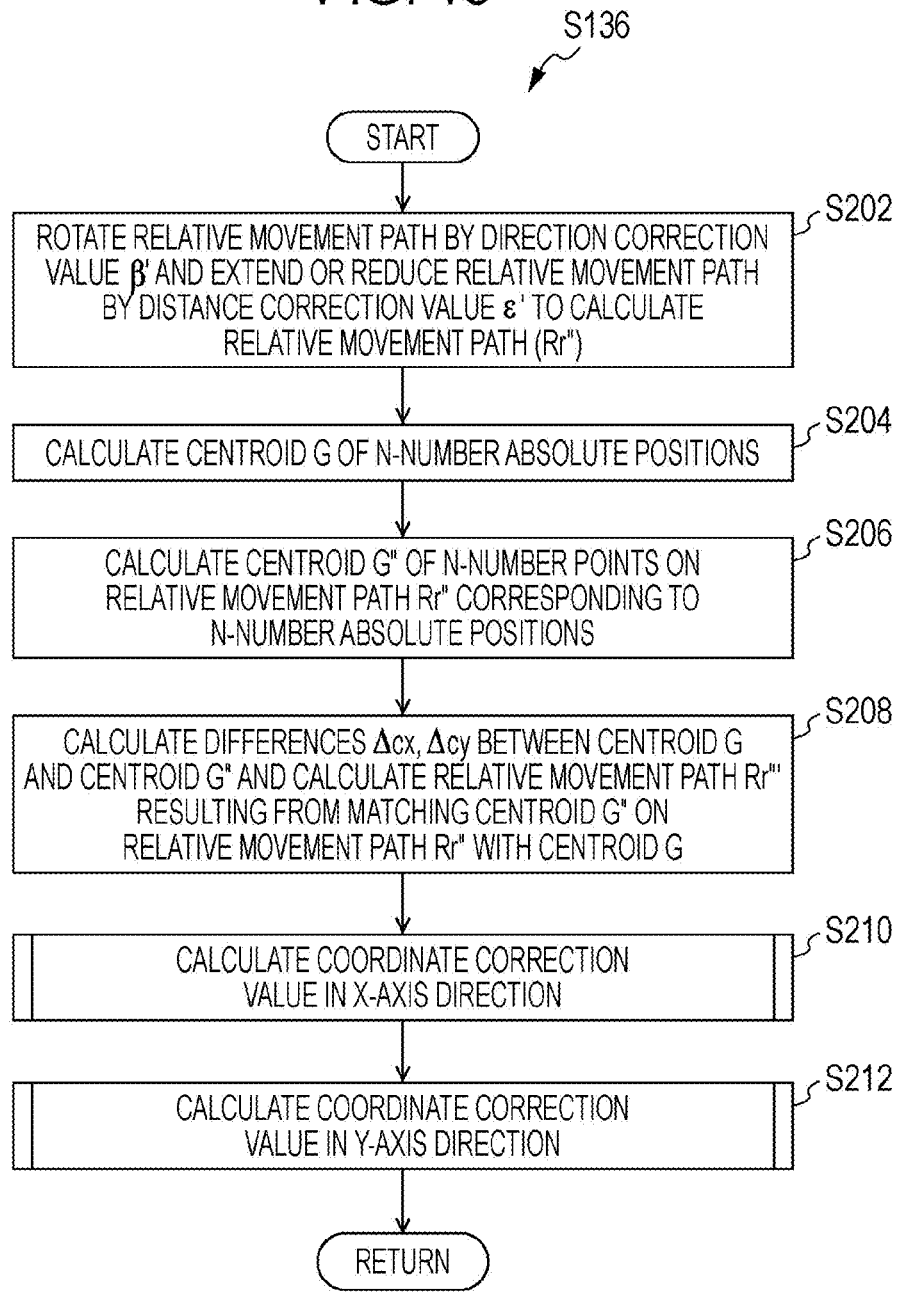

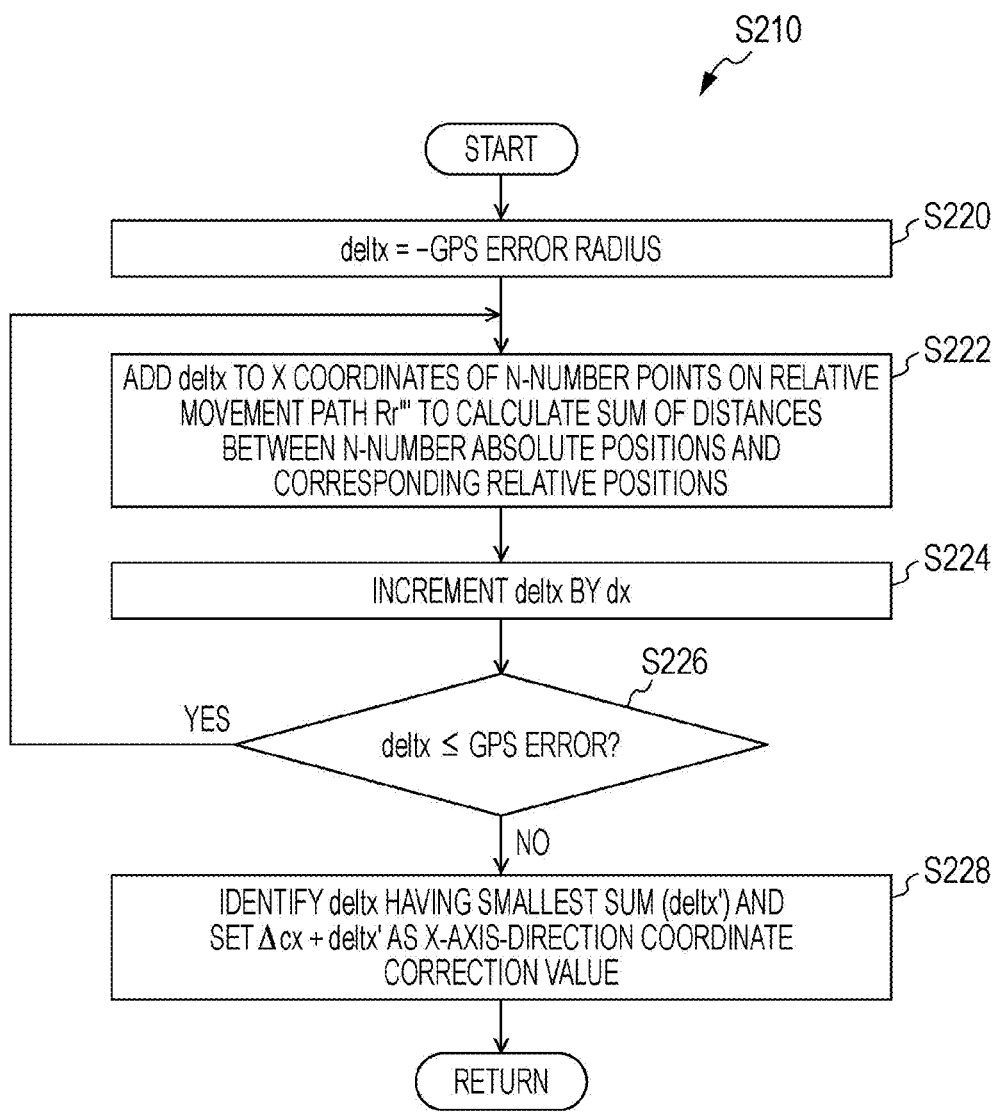

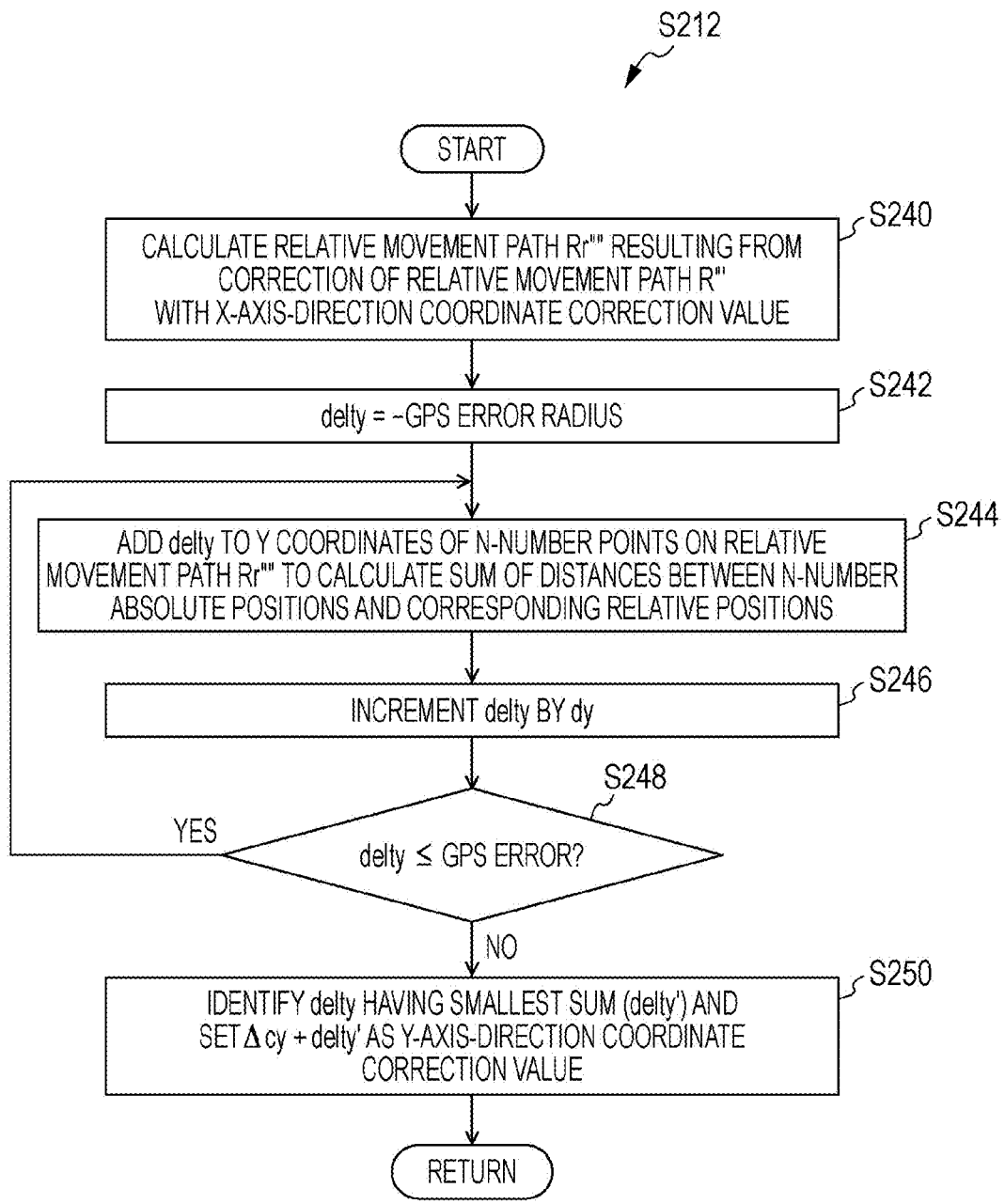

FIG. 23A

| NUMBER OF STEPS | COORDINATE VALUE x | COORDINATE VALUE y |
|---|---|---|
| 0 | 0 | 0 |
| 1 | 0 | 0.7 |
| 2 | 0 | 1.4 |
| 3 | 0 | 2.1 |
| 4 | 0 | 2.8 |
| 5 | 0 | 3.5 |
| ... | ... | ... |

ROTATED RELATIVE MOVEMENT PATH
(DIRECTION CORRECTION VALUE IS EQUAL TO 90°)

FIG. 23B

| NUMBER OF STEPS | COORDINATE VALUE x | COORDINATE VALUE y |
|---|---|---|
| 0 | 0 | 0 |
| 1 | 0 | 0.77 |
| 2 | 0 | 1.54 |
| 3 | 0 | 2.31 |
| 4 | 0 | 3.08 |
| 5 | 0 | 3.85 |
| ... | ... | ... |

EXTENDED OR REDUCED RELATIVE MOVEMENT PATH
(DISTANCE CORRECTION VALUE IS EQUAL TO 1.1)

FIG. 24A

| NUMBER OF STEPS | COORDINATE VALUE x | COORDINATE VALUE y |
|---|---|---|
| 0 | -0.2 | -2.0 |
| 1 | -0.2 | -1.23 |
| 2 | -0.2 | -0.46 |
| 3 | -0.2 | 0.31 |
| 4 | -0.2 | 1.08 |
| 5 | -0.2 | 1.85 |
| ... | ... | ... |

RELATIVE MOVEMENT PATH SUBJECTED COORDINATE CORRECTION
(X-AXIS COORDINATE CORRECTION VALUE -0.2(m),
Y-AXIS COORDINATE CORRECTION VALUE -2(m))

FIG. 24B

| NUMBER OF STEPS | COORDINATE VALUE x | COORDINATE VALUE y | LATITUDE | LONGITUDE |
|---|---|---|---|---|
| 0 | -0.2 | -2.0 | 35.58559203 | 139.6392978 |
| 1 | -0.2 | -1.23 | 35.58559895 | 139.6392978 |
| 2 | -0.2 | -0.46 | 35.58560587 | 139.6392978 |
| 3 | -0.2 | 0.31 | 35.58561278 | 139.6392978 |
| 4 | -0.2 | 1.08 | 35.5856197 | 139.6392978 |
| 5 | -0.2 | 1.85 | 35.58562662 | 139.6392978 |
| ... | ... | ... | ... | ... |

APPARATUS AND METHOD FOR CALCULATING ABSOLUTE MOVEMENT PATH AND RECORDING MEDIUM

CROSS-REFERENCE TO RELATED APPLICATIONS

This application is based upon and claims the benefit of priority of the prior Japanese Patent Application No. 2008-295292, filed on Nov. 19, 2008, the entire contents of which are incorporated herein by reference.

FIELD

The present embodiments relate to an apparatus and method for calculating an absolute movement path and a computer-readable recording medium storing a program for calculating an absolute movement path.

More particularly, the embodiments relate to an absolute-movement-path calculating apparatus, an absolute-movement-path calculating method, and a computer-readable recording medium storing a program for causing a computer to calculate an absolute movement path of a terminal.

BACKGROUND

Hitherto, development of portable terminals (mobile terminals) which are provided with an apparatus for calculating a movement path (walking path) of a user by using autonomous navigation has been advanced (refer to Japanese Unexamined Patent Application Publication No. 11-194033).

Such an apparatus has, for example, a direction detecting function to detect a movement direction, a number-of-steps detecting function to detect a number of steps, a movement-distance calculating function to calculate a movement distance from the number of steps and a one step length that is input in advance, and a position detecting function to acquire an absolute position of a present location by using, for example, a global positioning system (GPS) receiver. The apparatus calculates a movement path of a user based on the values (the absolute position, the direction, the movement distance, etc.) acquired by using the above functions.

In addition, advanced safety services have received attention in recent years. The advanced safety services locate positions of vehicles on roads to provide information, warning, intervention control, etc. for the vehicles based on the located positions.

For example, position locating technologies using optical beacons provided on roads and optical beacon receivers which are in-vehicle devices are disclosed. The use of such a technology enables a vehicle to receive, for example, a stop warning service at an intersection at a time when the vehicle passes below an optical beacon provided before the vehicle enters the intersection (refer to Japanese Unexamined Patent Application Publication No. 2009-19979, and Japanese Unexamined Patent Application Publication No. 2009-26056).

However, since the number-of-steps measuring function in the related art can cause an error in the number of steps, the number of steps that is counted can be larger than or smaller than the actual number of steps. In addition, since the step length is set by the user, the difference in the step length can occur between the set step length and the actual step length.

In order to resolve above problems, methods for calculating accurate step lengths are disclosed. For example, Japanese Unexamined Patent Application Publication No. 09-89584 discloses a method of calculating a distance between two GPS measured values and dividing the distance by the number of steps to calculate an accurate step length. However, since a measurement error can occur in the GPS and an error in the number of steps can also occur, as described above, it may be difficult to calculate the accurate step length with the above technology.

In the related art, when a terminal is inclined, the inclination of the terminal is corrected to calculate an accurate azimuth by using direction detecting functions (refer to Japanese Unexamined Patent Application Publication No. 08-278137 and Japanese Unexamined Patent Application Publication No. 2004-286732). However, if the direction depicted by the terminal (the reference direction of the terminal) is different from the movement direction of a user carrying the terminal (for example, if the user advances while carrying the terminal that is transversely situated), it is not possible to correct the difference in the direction. As a result, a difference (direction difference) can occur between the direction measured by the terminal and the actual direction.

Furthermore, values measured by the GPS are directly used as the absolute positions in the autonomous navigation in the related art. The absolute positions are revised by calculating a distance corresponding to the measurement error because the measurement error is highly possible to occur in the GPS, as described above. In addition, various services including a service (right-turn assistance service) for depicting a timing to change a lane on a road when a vehicle is to turn right on the road, are proposed in the advanced safety services in vehicles. However, in order to realize the right-turn assistance service or the like, it is necessary to determine which lane the vehicle is on, whether the vehicle enters an intersection in which the vehicle is located, and so on.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

SUMMARY

According to embodiments, an absolute-movement-path calculating apparatus includes a direction acquirer detecting a movement direction of a terminal by referencing a standard axis defined for a terminal in advance at a given timing; a movement-distance calculator calculating a movement distance of the terminal at the given timing; a relative-movement-path calculator calculating a relative movement path, based on both the detection result in the direction acquirer and the detection result in the movement-distance calculator, and storing the relative movement path; an absolute-position acquirer acquiring an absolute position of the terminal, which corresponds to a start position of the calculated relative movement path and which is indicated by an absolute coordinate represented by a longitude and latitude, and storing the absolute position; and an absolute-movement-path calculator calculating, each time the absolute positions of a given number are stored, a correction value from the relationship between at least two absolute positions among the absolute positions of the given number, and the relative positions corresponding to the absolute positions and calculating an absolute movement path of the terminal indicated by the absolute coordinate from the correction value and the relative movement path.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 5 is a table depicting an example of data resulting from operation S10 in FIG. 2;

FIG. 6 is a table depicting an example of data generated after operation S16 in FIG. 2;

FIG. 11 is an operation chart depicting operation S158 in FIG. 10 in detail;

FIG. 18 is an operation chart depicting operation S136 (calculation of a coordinate correction value) in FIG. 8 in detail;

FIG. 19 is an operation chart depicting operation S210 (calculation of a coordinate correction value in an X axis direction) in FIG. 18 in detail;

FIG. 20 is an operation chart depicting operation S212 (calculation of a coordinate correction value in a Y axis direction) in FIG. 18 in detail;

FIG. 23A is a table depicting data about the relative path after correction, resulting from operation S262 in FIG. 22;

FIG. 23B is a table depicting data about the relative path after correction, resulting from operation S264 in FIG. 22;

FIG. 24A is a table depicting data about the relative path after correction, resulting from operation S266 in FIG. 22;

FIG. 24B is a table depicting data about the relative path after correction, resulting from operation S268 in FIG. 22;

DETAILED DESCRIPTION OF THE PREFERRED EMBODIMENTS

Figure 1:
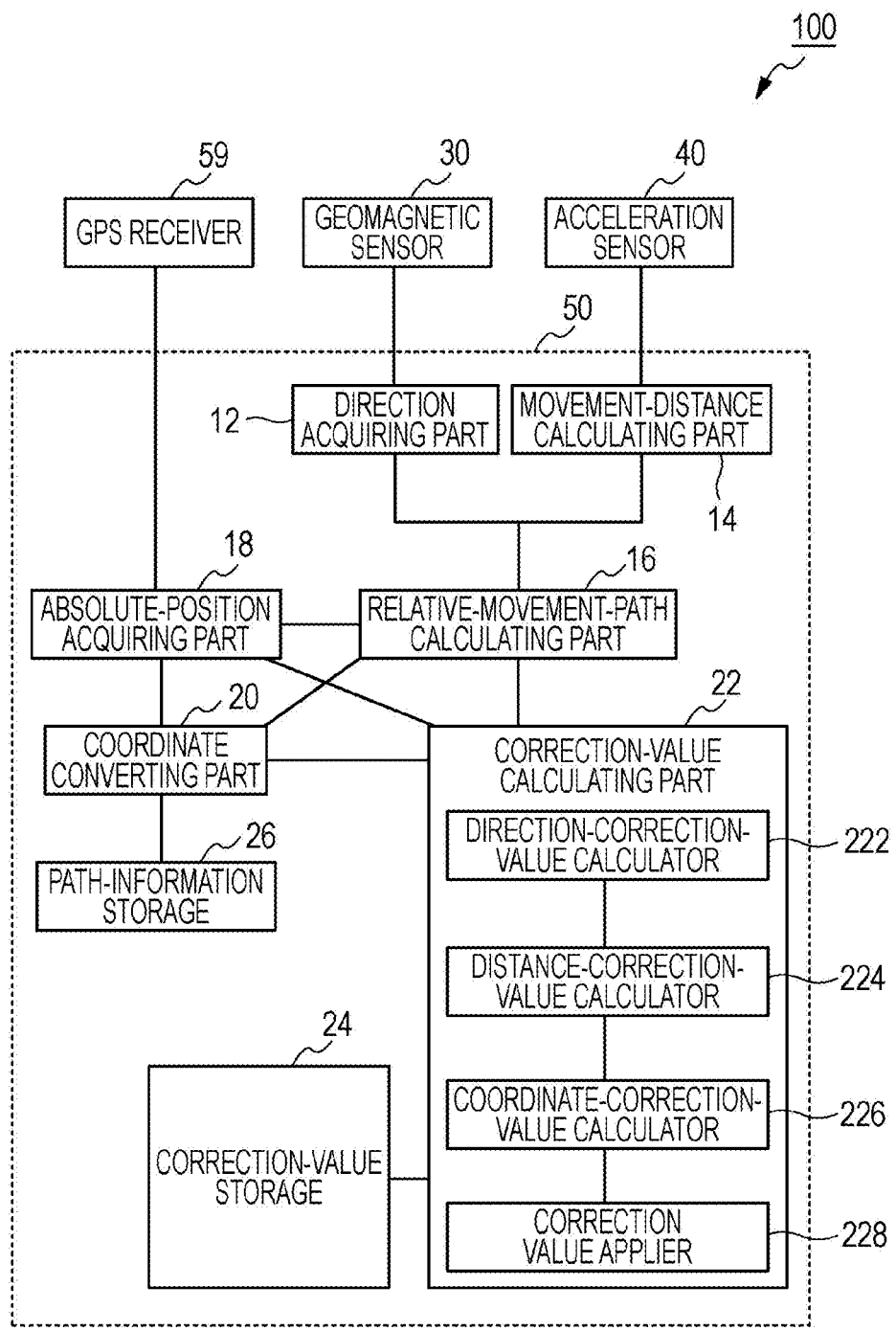
FIG. 1 is a block diagram schematically depicting an example of the configuration of a mobile telephone (particularly, a movement-path detecting apparatus) according to a first embodiment.

Reference may now be made in detail to embodiments of the present invention, examples of which are illustrated in the accompanying drawings, wherein like reference numerals refer to like elements throughout.

An error in distance, a direction, and/or position occur in the calculation of a walking path by using the autonomous navigation in the related art, preventing accurate calculation of the path.

Although the time when a vehicle passes below an optical beacon can be accurately determined with the position locating technologies described above, it is hard to accurately determine, for example, which lane the vehicle is in after passing below the optical beacon, or how far the vehicle is from an intersection in which the vehicle is located. Accordingly, in order to improve the advanced safety service, it is necessary to accurately determine the traveling path of the vehicle by using the autonomous navigation, as in the case of the walking path.

In addition, a method is commonly used in the autonomous navigation in vehicles in which a variation in direction is acquired by a gyro sensor and the traveling distance is acquired by a vehicle-speed pulse sensor. However, since it is necessary to set the initial value for the direction in the gyro sensor, and a difference in measurement occurs between the gyro sensor and the vehicle-speed pulse sensor, a shift from the actual movement path occurs with the increasing traveling distance.

It is an object of the present invention to provide an absolute-movement-path calculating apparatus, an absolute-movement-path calculating method, and a computer-readable recording medium storing a program for accurately calculating an absolute movement path of a terminal.

The movement-path calculating apparatus, the absolute-movement-path calculating method, and the program described in this specification have the advantage of accurate calculation of the absolute movement path of a terminal.

First Embodiment

A first embodiment of the present invention will herein be described in detail with reference to FIGS. 1 to 24B.

FIG. 1 is a block diagram depicting an example of the configuration of a mobile telephone 100, which is a mobile terminal provided with an absolute-movement-path calculating apparatus according to an embodiment of the present invention. Referring to FIG. 1, the mobile telephone 100 includes a geomagnetic sensor 30, an acceleration sensor 40, a GPS receiver 59, and an absolute-movement-path calculating apparatus 50. Although the mobile telephone 100 has various functions including a calling function, a mailing function, an Internet communication function, and a camera function, examples of the configurations concerning these functions are omitted in FIG. 1.

The absolute-movement-path calculating apparatus 50 includes a direction acquiring detecting part 12, a movement-distance calculating part 14 serving as a movement-distance calculating part, a relative-path calculating part 16 serving as a relative-movement-path calculating part, an absolute-position acquiring part 18, a coordinate converting part 20, a correction-value calculating part 22, a correction-value storage 24, and a path-information storage 26. The coordinate converting part 20 and the correction-value calculating part 22 compose an absolute-movement-path calculating part.

The direction acquiring detecting part 12 acquires a geomagnetic value detected by the geomagnetic sensor 30 to acquire a direction (hereinafter referred to as a relative direction) by referring a standard axis defined in the mobile telephone 100 in advance on the basis of the geomagnetic value. For example, a magnetic orientation sensor capable of detecting the geomagnetism on a three-axis coordinate system is used as the geomagnetic sensor 30.

The movement-distance calculating part 14 holds information about a step length indicating the length of one step of a user in advance. The step length information is input by the user. The movement-distance calculating part 14 uses the step length information and information about the number of steps calculated from the acceleration detected by the acceleration sensor 40 to calculate the movement distance (=the step length×the number of steps) of the user. For example, a sensor of detecting accelerations in the three-axis directions is used as the acceleration sensor 40. The movement distance is calculated in the same manner as in pedometers using acceleration sensors.

The relative-path calculating part 16 uses the relative direction acquired by the direction acquiring part 12 and the distance calculated by the movement-distance calculating part 14 to calculate a relative movement path (hereinafter simply referred to as a "relative path"). The absolute-position acquiring part 18 acquires an absolute position (represented by a longitude and latitude) via the GPS receiver 59.

The coordinate converting part 20 performs inter-conversion between the coordinate system (the coordinate system represented by longitudes and latitudes) of the absolute position acquired by the absolute-position acquiring part 18 and the coordinate system (for example, an X-Y coordinate system representing distances) of the relative path calculated by the relative-path calculating part 16.

The correction-value calculating part 22 includes a direction-correction-value calculator 222, a distance-correction-value calculator 224, a coordinate-correction-value calculator 226, and a correction value applier 228, as depicted in FIG. 1. The direction-correction-value calculator 222 calculates a direction correction value used for correcting an error in the relative direction on the basis of the relative path and multiple absolute positions. The distance-correction-value calculator 224 calculates a distance correction value used for correcting an error concerning the distance on the basis of the relative path and multiple absolute positions. The coordinate-correction-value calculator 226 calculates a coordinate correction value used for correcting an error in the coordinate on the basis of the relative path and multiple absolute positions. The correction values calculated by the direction-correction-value calculator 222, the distance-correction-value calculator 224, and the coordinate-correction-value calculator 226 are temporarily stored in the correction-value storage 24. The correction value applier 228 reads out each correction value, as needed, to correct the relative path on the basis of the readout correction value.

The path-information storing part 26 stores a result of conversion of the relative path corrected by the correction-value calculating part 22 into an absolute coordinate by the coordinate converting part 20.

A process of creating a walking history according to the present embodiment will now be described in detail according to an operation chart in FIG. 2 and with reference to other drawings.

Figure 2:
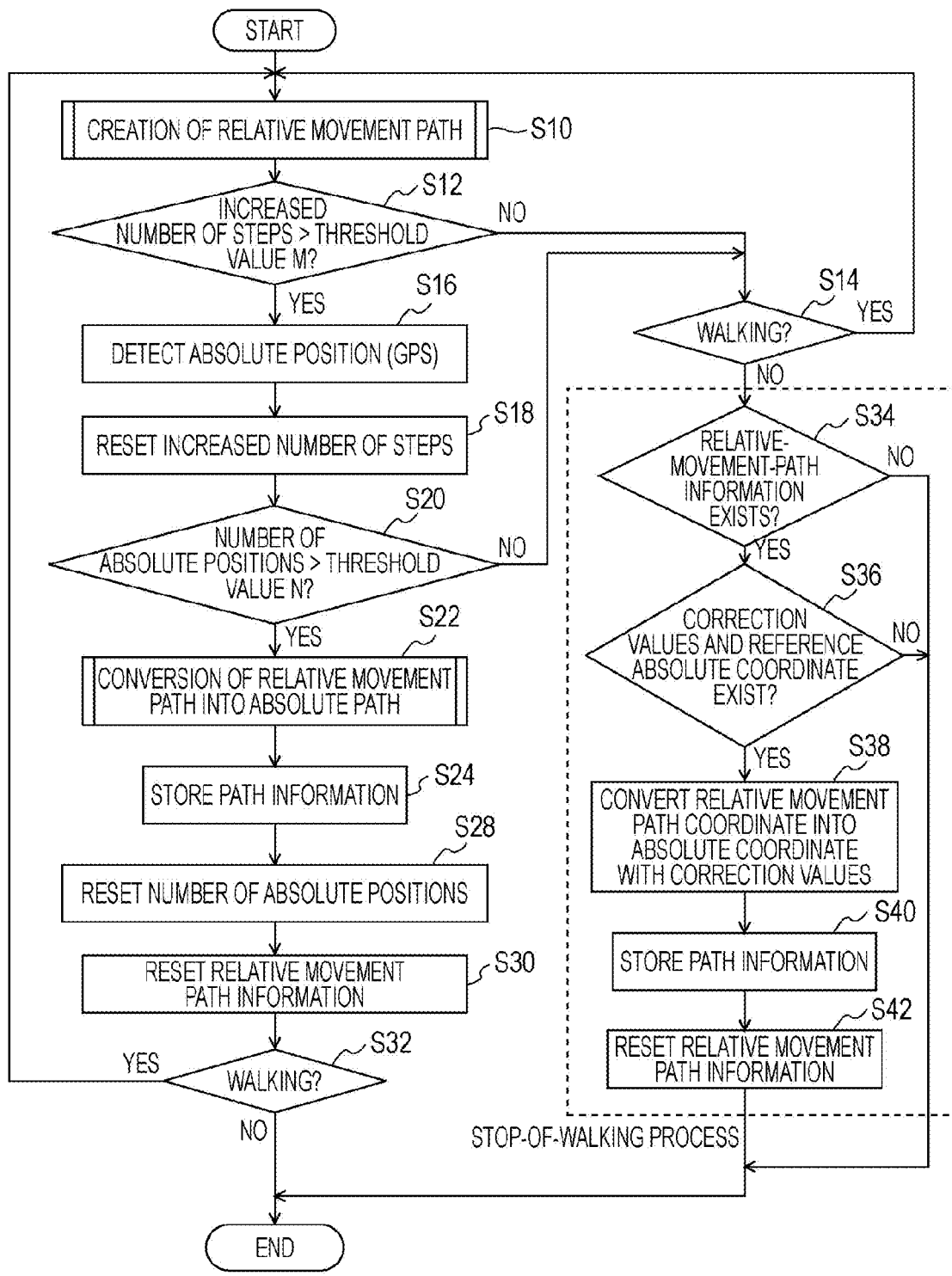
FIG. 2 is an operation chart depicting a process performed by an absolute-movement-path calculating apparatus.

The operation chart in FIG. 2 depicts a process started when the movement-distance calculating part 14 detects measurement by the acceleration sensor 40 in response to start of walking of the user carrying the mobile telephone 100.

Figure 3:
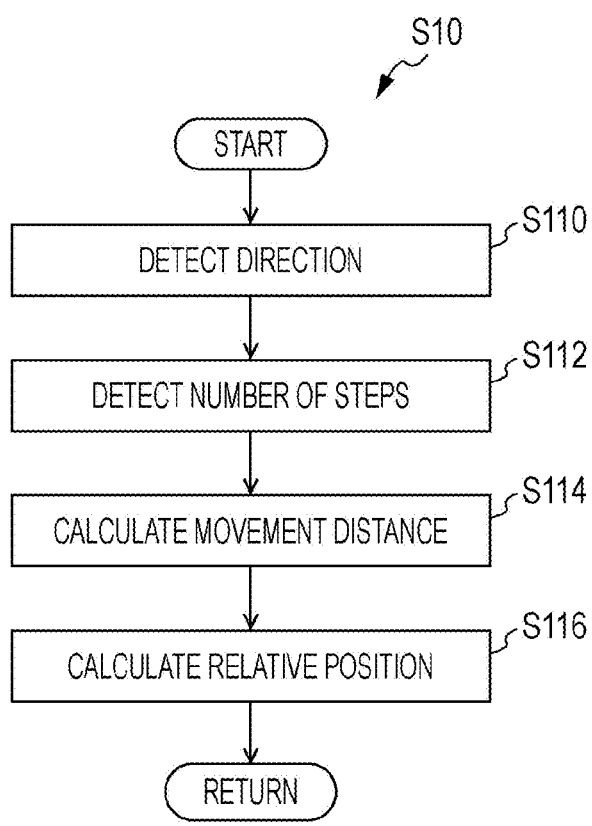
FIG. 3 is an operation chart depicting operation S10 in FIG. 2 in detail.

Referring to FIG. 2, at operation S10, the relative-path calculating part 16, etc. executes a subroutine to create a relative path since the start of the walking depicted in FIG. 3. Referring to FIG. 3, at operation S110, the direction acquiring part 12 detects a relative direction via the geomagnetic sensor 30. At operation S112, the movement-distance calculating part 14 counts the number of steps of the user via the acceleration sensor 40. At operation S114, the movement-distance calculating part 14 uses the number of steps of the user and the step length that is input by the user in advance to calculate a movement distance. In this case, the movement distance can be calculated according to Expression (1):

$$\text{(Movement distance)} = \text{(a number of steps)} \times \text{(a step length)} \quad (1)$$

At operation S116, the relative-path calculating part 16 calculates the position of the user from the relative direction detected at operation S110 and the movement distance calculated at operation S114 as a value on a relative coordinate system (the X-Y coordinate system representing distances with respect to the origin (0, 0) indicating the position where the user starts walking).

Figure 4:
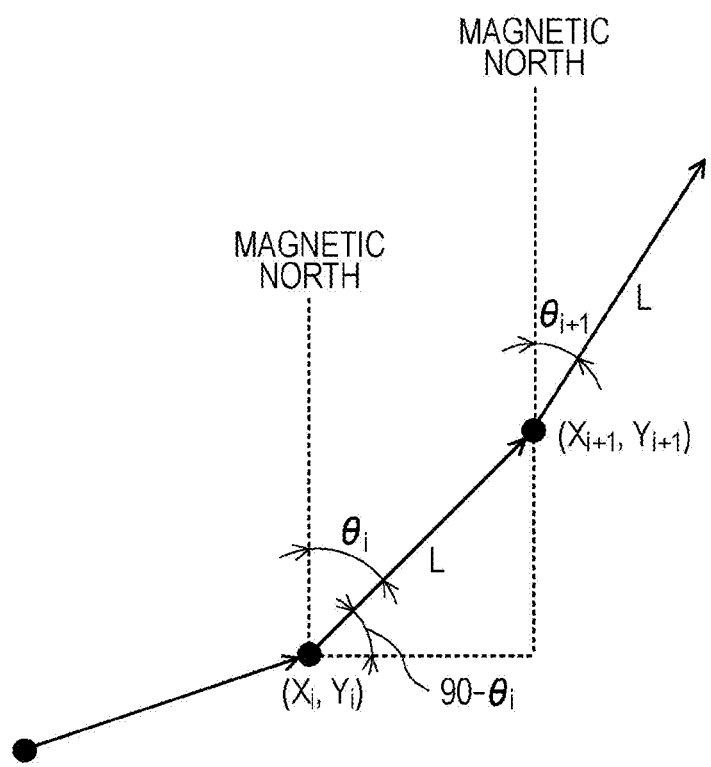
FIG. 4 illustrates the processing at operation S110 in FIG. 3 in detail.
Figure 7:
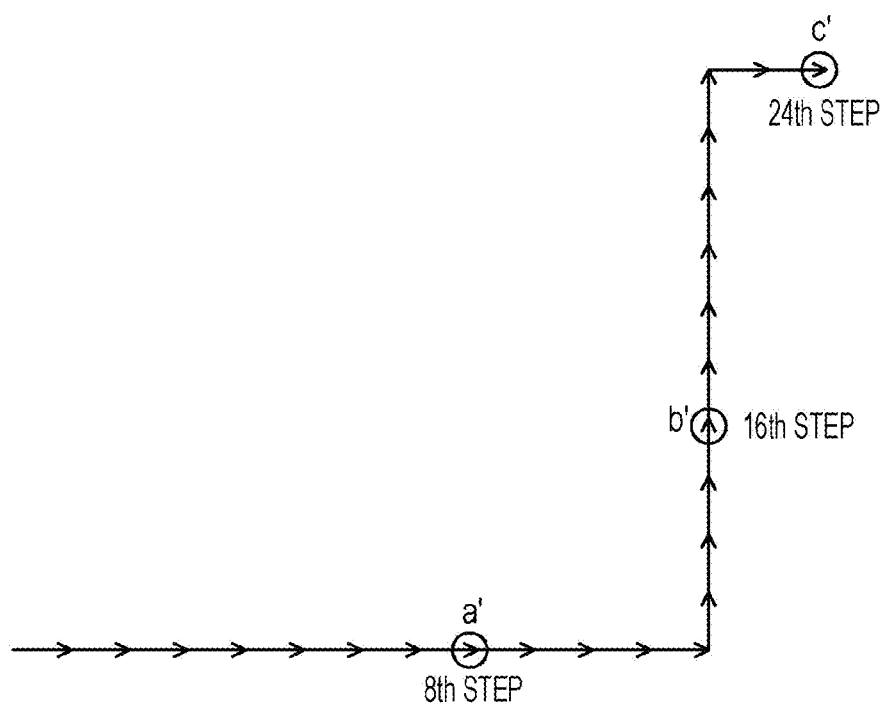
FIG. 7 schematically depicts a relative path and relative positions resulting from the processing before determination at operation S20 in FIG. 2 is affirmative.

Specifically, as depicted in FIG. 4, the relative position $(X_{i+1}, Y_{i+1})$ of the user is represented according to Expressions (2) and (3) using the previous position $(X_i, Y_i)$:

$$X_{i+1} = X_i + L \cos(90 - \theta_i) \quad (2)$$

$$Y_{i+1} = Y_i + L \sin(90 - \theta_i) \quad (3)$$

where $\theta_i$ denotes the relative direction (angle) (the direction detected at operation S110) of the mobile telephone 100 with respect to the magnetic north (the direction depicted by the north (N) pole of magnetic compasses) and L denotes the step length.

Since the coordinate $(X_0, Y_0)$ of the position where the user starts walking is equal to (0, 0), the relative position $(X_1, Y_1)$ at the first step is represented according to Expression (2)' and (3)':

$$X_1 = L \cos(90 - \theta_1) \quad (2)'$$

$$Y_1 = L \sin(90 - \theta_1) \quad (3)'$$

The execution of operation S10 in FIG. 2 (the subroutine in FIG. 3) for every step on the basis of the information about the number of steps calculated from the acceleration detected by the acceleration sensor 40 allows the movement path (relative path) of the user carrying the mobile telephone 100 to be acquired.

Referring back to FIG. 2, at operation S12, the relative-path calculating part 16 determines whether the increased number of steps exceeds a threshold value M. It is assumed here that the threshold value M is equal to, for example, eight (steps). If the determination at operation S12 is negative, the process goes to operation S14. At operation S14, the movement-distance calculating part 14 monitors the acceleration sensor 40 to determine whether the user is walking. If the determination at operation S14 is affirmative, the process goes back to operation S10.

Then, the processing and determination at operations S10, S12, and S14 are repeated until the determination at operation S12 is affirmative (until the user has walked eight steps) or the determination at operation S14 is negative (until the user stops walking).

If the determination at operation S12 is affirmative as the result of the above processing and determination, the process goes to operation S16. The above processing results in acquisition of data depicted in a table in FIG. 5. The date and time when each piece of data is acquired, the number of (1)

steps since the user starts walking, the azimuth, the coordinate values (Xi, Yi) are recorded in the table in FIG. 5. It is assumed here that the step length of the user is set to 0.7 m.

At operation S16, the absolute-position acquiring part 18 detects an absolute position (a position represented by a longitude and latitude) by using the GPS receiver 59. The detection result is recorded as the GPS measured value at the eighth step operation, as depicted in a table in FIG. 6. Although it takes a few seconds to produce the measurement result after the corresponding measurement request is received when the GPS measurement is actually performed, it is assumed here that the measurement result is produced immediately after the measurement request is received for convenience.

At operation S18, the relative-path calculating part 16 resets the increased number of steps (returns the increased number of steps, eight, to zero).

At operation S20, it is determined whether the number of the absolute positions detected at operation S16 exceeds a threshold value N. It is assumed here that the threshold value N is equal to two. The determination at operation S20 is affirmative if the number of absolute positions becomes equal to three. Since the number of absolute positions that have been measured is only one at this time, the determination at operation S20 is negative and the process goes to Operation S14.

If the determination at operation S14 is affirmative, the loop including Steps S10, S12, and S14 is repeated. Then, if the relative positions corresponding to another eight steps are acquired, the absolute position is detected again at operation S16 and the process goes to Operation S14 through Operations S18 and S20. Then, if the third absolute position is detected as the result of the repetition of the above processing, the determination at operation S20 is affirmative. The above processing results in acquisition of the relative path represented by continuous arrows depicted in FIG. 7 and the relative positions for every eight steps. Hereinafter, the relative position at the eighth step is denoted by a' and the absolute position measured at the eighth step is denoted by a. Similarly, the relative position at the 16-th step operation is denoted by b', the absolute position measured at the 16-th step is denoted by b, the relative position at the 24-th step is denoted by c', and the absolute position measured at the 24-th step is denoted by c (refer to FIG. 12A in terms of the absolute positions a, b, and c).

Figure 8:
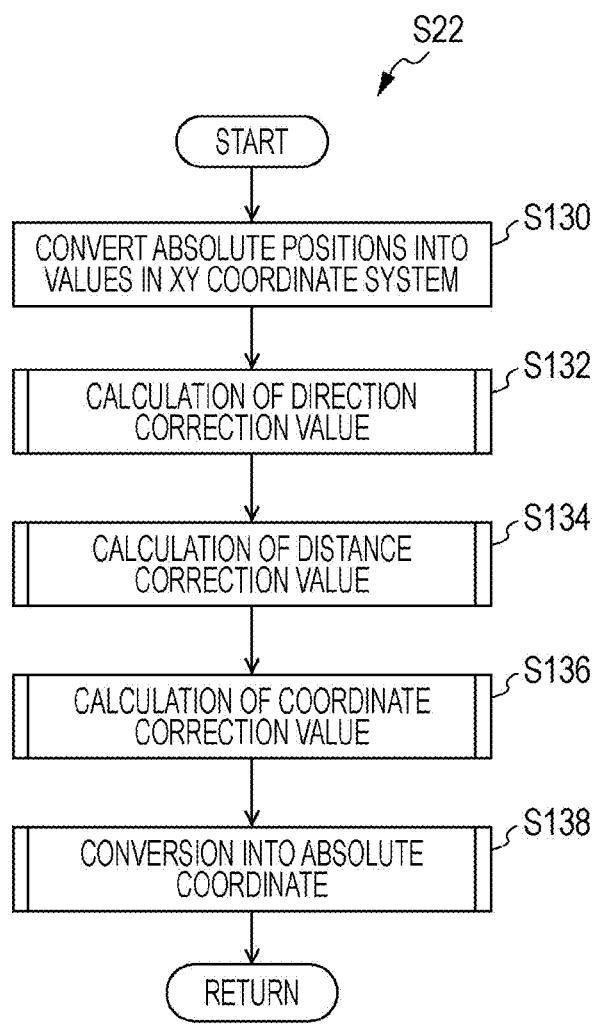
FIG. 8 is an operation chart depicting operation S22 in FIG. 2 in detail.

Referring back to FIG. 2, at operation S22, a subroutine to convert a relative path into an absolute path is executed according to an operation chart in FIG. 8. This subroutine includes a correction process (at operations S130 to S136) to bring the relative path acquired at operation S10 close to the path along which the user actually moves (the actual movement path (refer to FIGS. 12A and 12B)) and a process (at operation S138) of converting the path subjected to the correction into an absolute coordinate.

Referring to FIG. 8, at operation S130, the coordinate converting part 20 converts the absolute positions (a, b, c) into values in the same coordinate system (the X-Y coordinate system indicating distances) as that of the relative path.

In this case, of the three absolute positions (a, b, c), the X-Y coordinates of the second and third absolute positions b and c are determined with respect to the X-Y coordinate (0, 0) of the first absolute position a.

The coordinate values are determined in the following manner:

In general, known methods of calculating distances from longitudes and latitudes include, for example, a calculation method by using spherical trigonometry in which the earth is assumed as a true sphere and a calculation method in which the earth is assumed as a plane. The calculation method in which the earth is assumed as a plane is adopted in the present embodiment.

Figure 9:
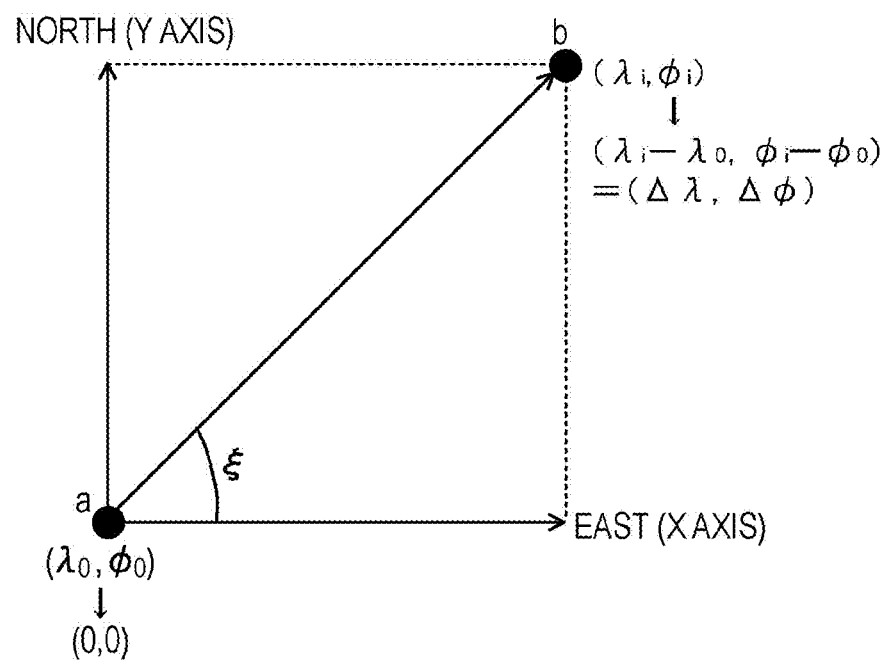
FIG. 9 illustrates operation S130 in FIG. 8.

FIG. 9 schematically depicts the relationship between the two absolute positions a and b. Referring to FIG. 9, $\lambda$ denotes longitude (rad) and $\phi$ denotes latitude (rad). When the longitude and latitude of the first absolute position a are represented as $(\lambda_0, \phi_0)$, which is set as the origin (0, 0), the longitude and latitude $(\lambda_i, \phi_i)$ of the second absolute position b are represented by $(\lambda_i - \lambda_0, \phi_i - \phi_0) = (\Delta\lambda, \Delta\phi)$.

In this case, the relative coordinate $(\Delta x, \Delta y)$ of the second absolute position b can be calculated according to Expressions (4) and (5):

$$\Delta x = A \times \Delta\lambda \times \cos(\phi i) \quad (4)$$

$$\Delta y = A \times \Delta\phi \quad (5)$$

where A denotes the equatorial radius (6,378,137 m) of the earth.

Also in the case of the remaining absolute position c, the distances (m) in the X axis (longitudinal) direction and the Y axis (latitudinal) direction from the longitude and latitude $(\lambda_0, \phi_0)$ of the first absolute position can be calculated to convert the calculated distances into values on the relative coordinate system (X-Y coordinate system) in the above manner. The longitude and latitude $(\lambda_0, \phi_0)$ of the absolute position a, used as the origin (0, 0) in the relative coordinate conversion, are stored in the correction-value storage 24 as a reference absolute coordinate.

Figure 12A:
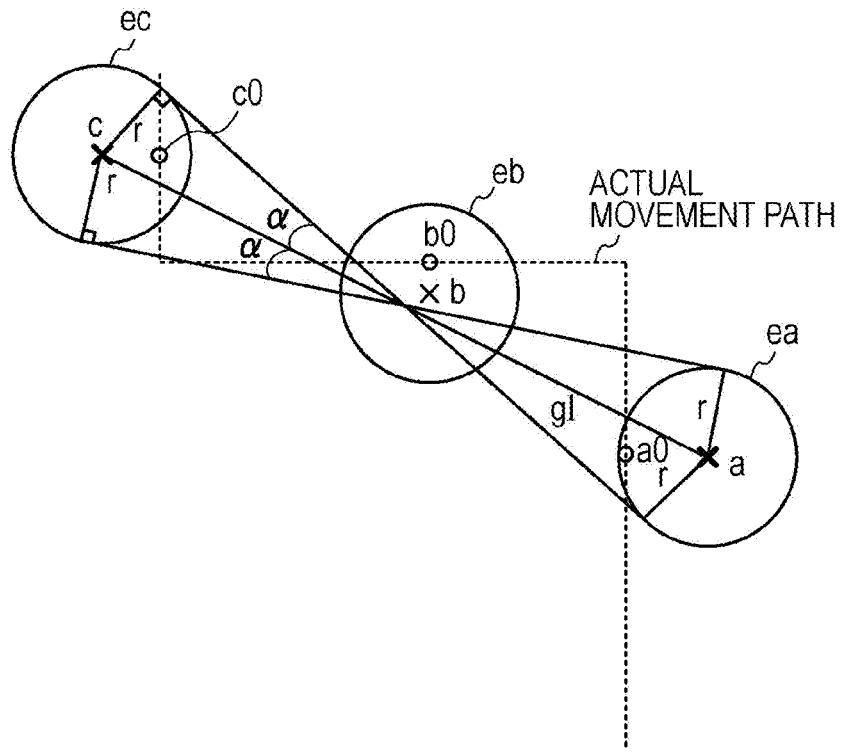
FIGS. 12A and 12B are diagrams illustrating the processing in FIG. 11.

Referring back to FIG. 8, at operation S132, a subroutine to calculate a direction correction value is executed. This subroutine to calculate a direction correction value is executed according to flowcharts in FIGS. 10 and 11. This method of calculating a direction correction value is especially effective in a case where an error in the absolute position (GPS measured value) occurs. Specifically, since the measurement error (denoted by circles ea, eb, and ec in FIG. 12A) occurs in the GPS measurement, positions shifted from actual measurement positions a0, b0, and c0 can be output as the GPS measured values, as depicted in FIG. 12A. However, the use of the following method enables the calculation of the direction correction value in consideration of the measurement error.

Figure 10:
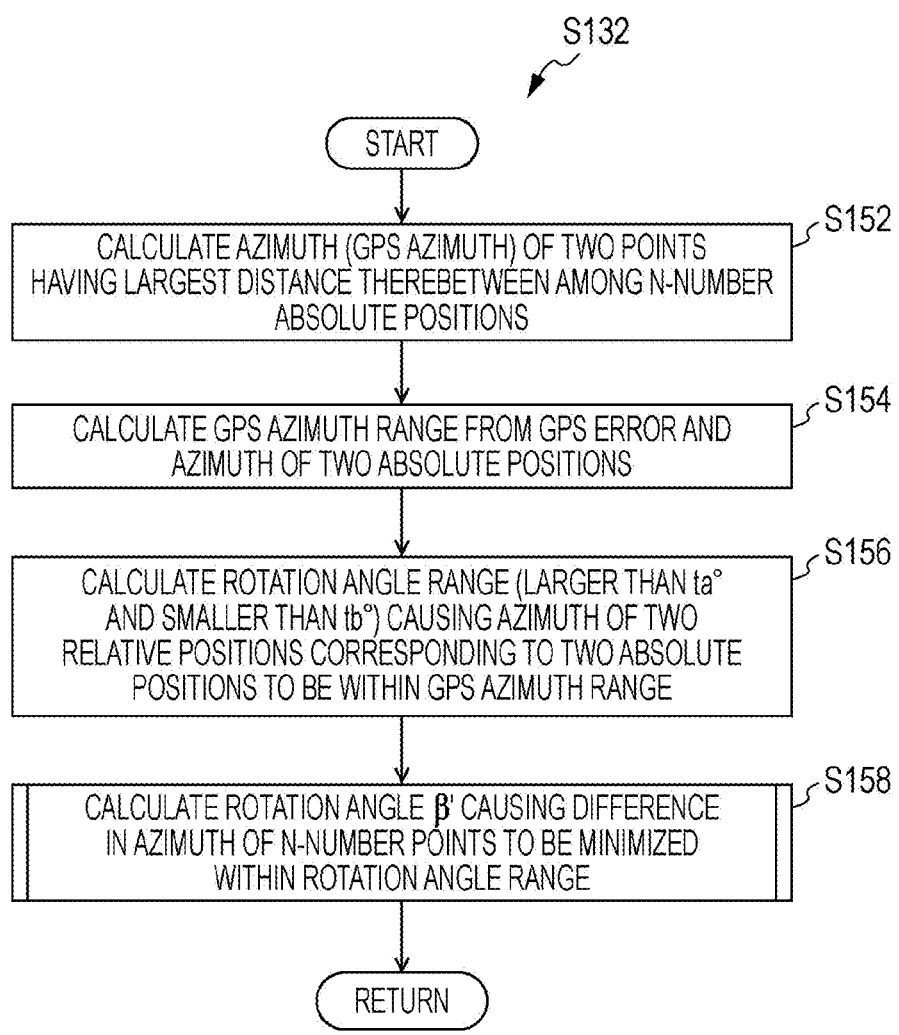
FIG. 10 is an operation chart depicting operation S132 (calculation of a direction correction value) in FIG. 8 in detail.

Referring to FIG. 10, at operation S152, the direction-correction-value calculator 222 calculates an azimuth κ between two points having the largest distance therebetween among N-number (three) absolute positions. This azimuth means the azimuth of a solid line (a straight line ac) connecting the point a with the point c in the example in FIG. 12A.

At operation S154, the direction-correction-value calculator 222 calculates a GPS azimuth range including the azimuth of two points that have been actually measured (of a straight line a0c0) from the GPS measurement error and the azimuth κ of the straight line ac.

In this case, the GPS azimuth range may be calculated according to s (6) and (7):

$$\alpha = \arcsin(r/gl/2) \quad (6)$$

$$\kappa - \alpha \leq \text{GPS azimuth range} \leq \kappa + \alpha \quad (7)$$

wherein r denotes the radius of the GPS measurement error and gl denotes the distance between the point a and the point c.

At operation S156, the direction-correction-value calculator 222 calculates a rotation angle range (larger than ta° and smaller than tb°) causing the azimuth of the two points (a', c') on the relative path corresponding to the GPS measured values at the two points (a, c) to be within the GPS azimuth range according to Expression (7).

Figure 12B:
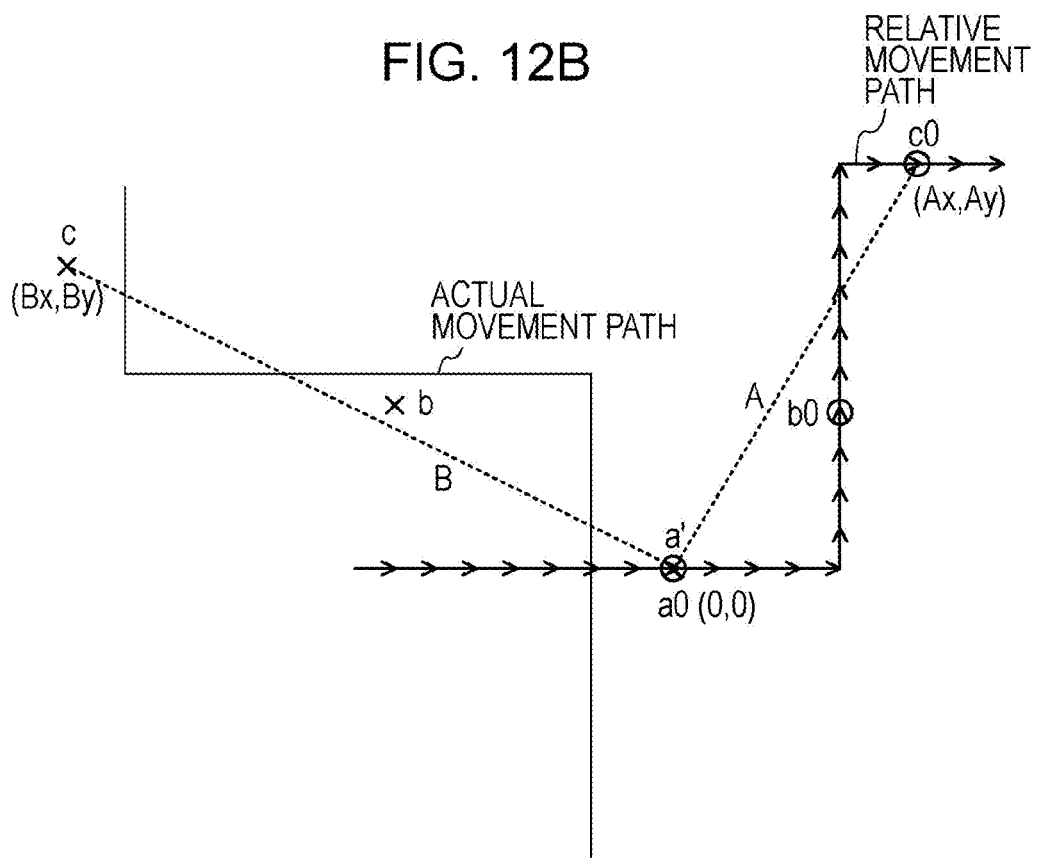

As depicted in FIG. 12B, the coordinate of the point c is represented by (Bx, By) and the vector from the point a to the point c is represented by B when the coordinate of the point a is set as the origin (0, 0) and the coordinate of the point c' is represented by (Ax, Ay) and the vector from the point a' to the point c' is represented by A when the coordinate of the point a' is set as the origin (0, 0) to determine the rotation angle from the vector A to the vector B.

Provided that the unit vector of the vector A is AE=A/|A| and the unit vector of the vector B is BE=B/|B|, a rotation angle ψ can be calculated according to Expression (8):

$$AE \cdot BE = |AE| \times |BE| \times \cos(\psi) \quad (8)$$

where 0°≤ψ≤180°. The direction of rotation can be determined from the sign of the vector product of the unit vector AE and the unit vector BE.

Accordingly, ta=ψ−α and tb=ψ+α by using the rotation angle ψ and the angle α calculated according to Expression (6).

At operation S158, the direction-correction-value calculator 222 executes a subroutine to calculate a rotation angle causing the difference in azimuth of the GPS measured values (a, b, c) and the relative positions (a', b', c') corresponding to the GPS measured values to be minimized within the rotation angle range (larger than (ψ−α)° and smaller than (ψ+α)°). A process depicted in an operation chart in FIG. 11 is executed here.

Figure 13A:
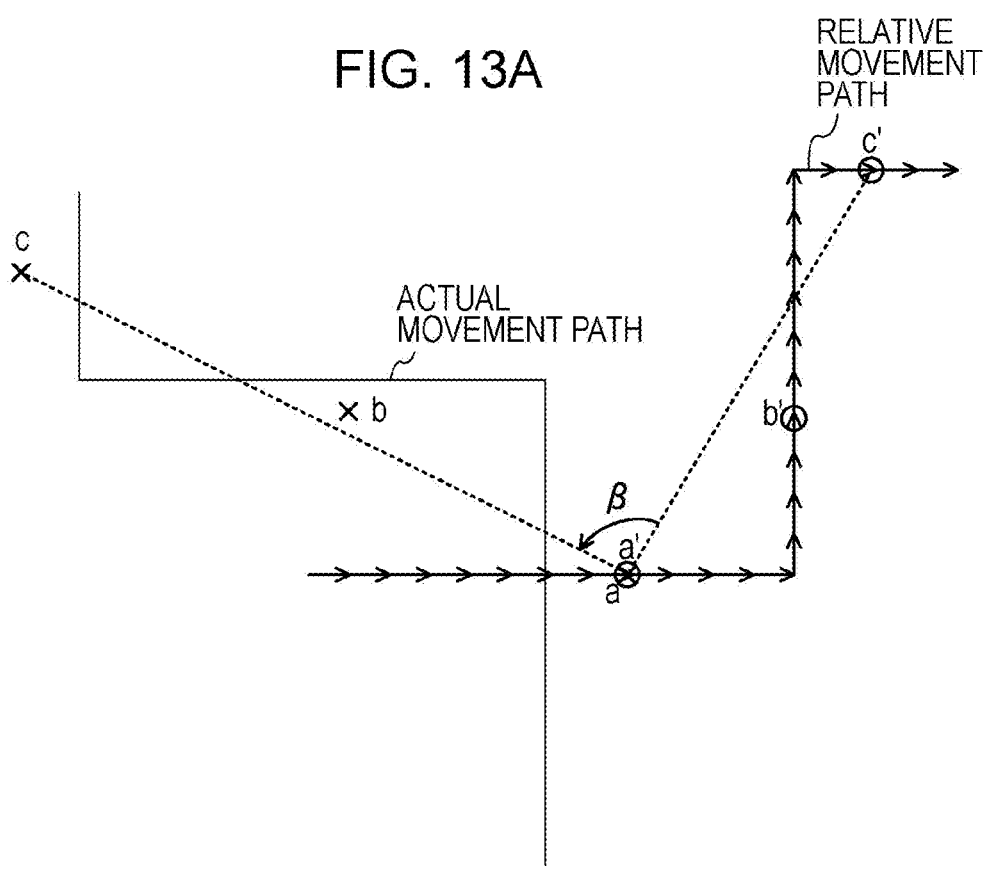
FIGS. 13A and 13B are other diagrams illustrating the processing in FIG. 11.

Referring to FIG. 11, at operation S160, the direction-correction-value calculator 222 sets a variable β of the rotation angle to ta (=ψ−α). At operation S162, the direction-correction-value calculator 222 rotates the relative positions (a', b', c') corresponding to the GPS measures values (a, b, c) by β°, as depicted in FIG. 13A. In this case, provided that the coordinate before the rotation is represented by (x, y) and the coordinate after the rotation is represented by (x', y'), x' and y'can be calculated according to Expressions (9) and (10):

$$x' = x \times \cos\beta - y \times \sin\beta \quad (9)$$

$$y' = x \times \sin\beta + y \times \cos\beta \quad (10)$$

Figure 13B:
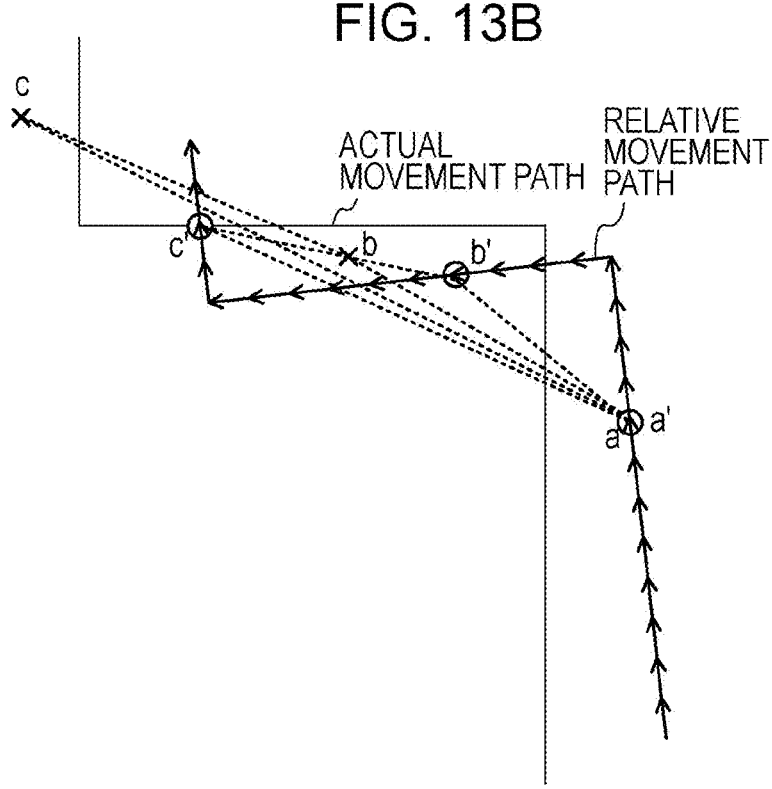
Figure 14A:
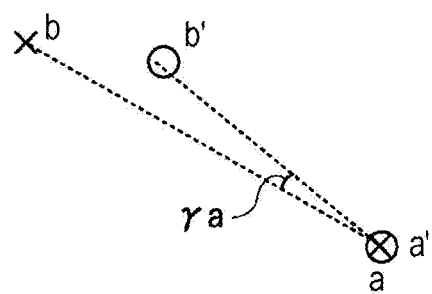
FIGS. 14A, 14B, and 14C are other diagrams illustrating the processing in FIG. 11.
Figure 14B:
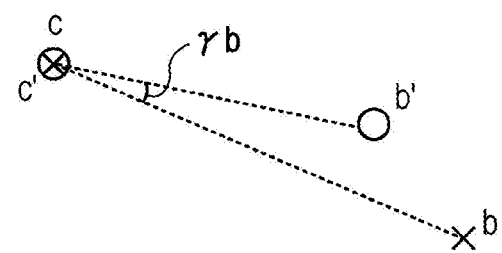
Figure 14C:
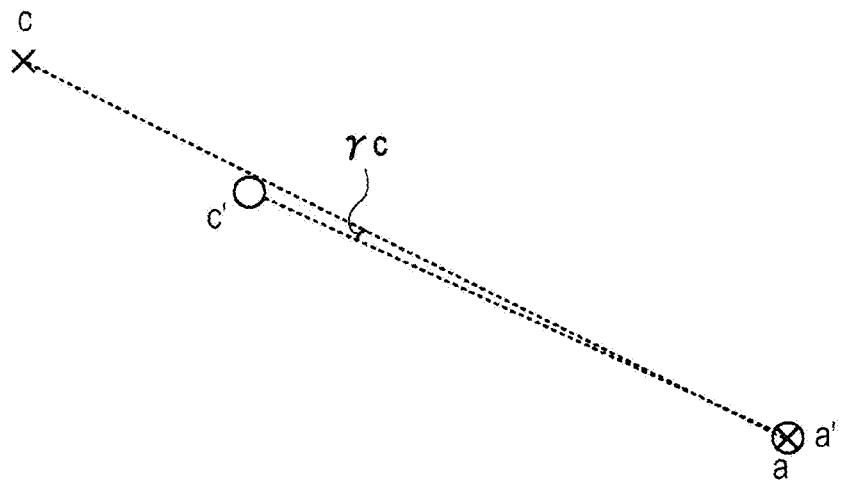

At operation S164, the direction-correction-value calculator 222 calculates angles between the sides of a polygon resulting from connection of N-number absolute positions (a triangle resulting from connection of three points in this embodiment) and the corresponding sides of a polygon resulting from connection of N-number relative positions (a triangle resulting from connection of three points in this embodiment), as depicted in FIG. 13B. Specifically, an angle γa between a side ab and a side a'b' depicted in FIG. 14A, an angle γb between a side bc and a side b'c' depicted in FIG. 14B, and an angle γc between a side ca and a side c'a' depicted in FIG. 14C are calculated. Then, the correction-value calculating part 22 calculates the sum of all the angles (γa+γb+γc).

At operation S166, the direction-correction-value calculator 222 increments the variable β of the rotation angle by Δ (Δ is equal to, for example, one degree). At operation S168, the direction-correction-value calculator 222 determines whether the variable β of rotation angle is not higher than tb=(ψ+α). If the determination at operation S168 is affirmative, the process goes back to Operation S162 to repeat operations S162, S164, and S166 in the above manner until the determination at operation S168 is negative. During this repetitive process, the calculation of the sum (γa+γb+γc) of the angles is repeated while shifting the relative path by one degree.

If the determination at operation S168 is negative, the direction-correction-value calculator 222 determines a rotation angle β' having the smallest sum of the angles (γa+γb+γc) and sets the rotation angle β' as the direction correction value at operation S170. The direction correction value β' is stored in the correction-value storage 24 in FIG. 1. Then, the process goes to Operation S134 in FIG. 8.

At operation S134, a subroutine to calculate a distance correction value is executed. This subroutine is executed according to an operation chart in FIG. 15.

Figure 15:
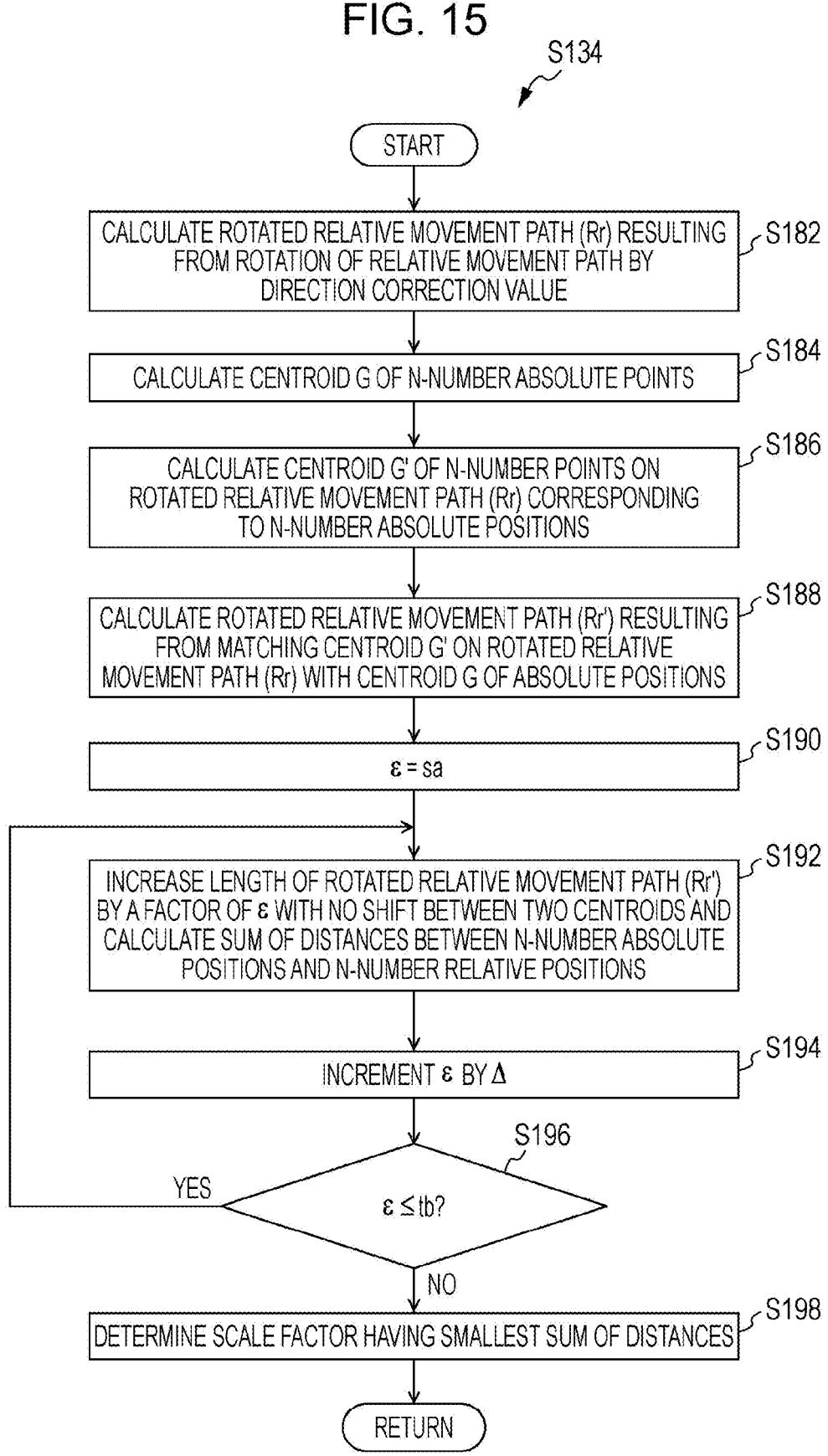
FIG. 15 is an operation chart depicting operation S134 (calculation of a distance correction value) in FIG. 8 in detail.

Referring to FIG. 15, at operation S182, the distance-correction-value calculator 224 calculates a rotated relative path (Rr) resulting from rotation of the relative path by the direction correction value β'.

At operation S184, the distance-correction-value calculator 224 calculates a centroid G (refer to FIG. 16A) of N-number absolute positions (three points here) (GPS measured values). The centroid G can be calculated from the average of the X coordinate values of the points a, b, and c and the average of the Y coordinate values thereof.

Figure 16A:
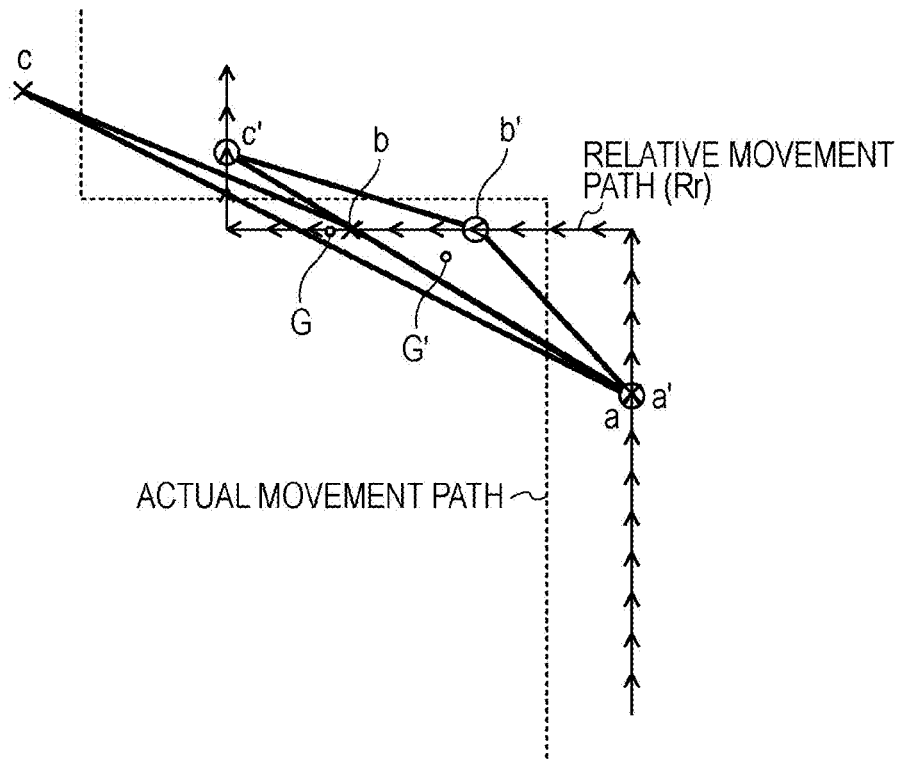
FIGS. 16A and 16B are diagrams illustrating the processing in FIG. 15.
Figure 16B:
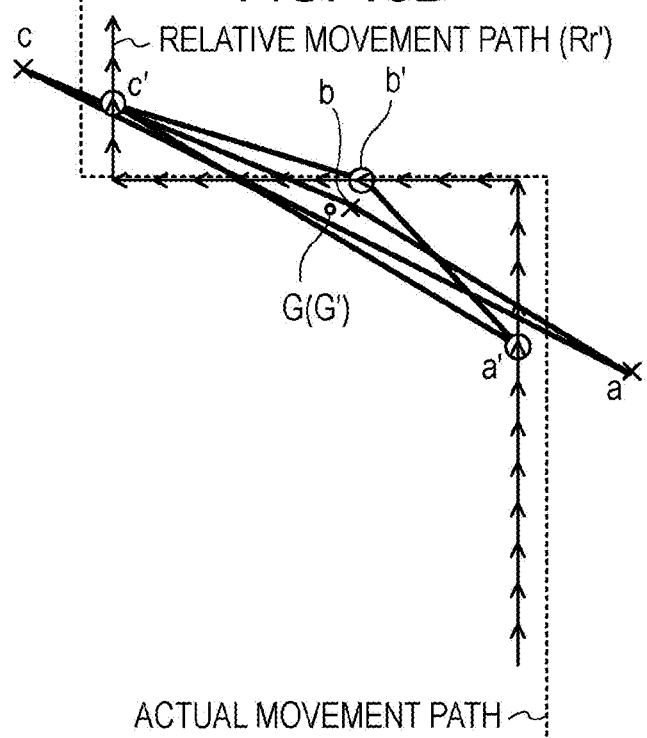

At operation S186, the distance-correction-value calculator 224 calculates a centroid G' (refer to FIG. 16A) of N-number points (a', b', c') on the rotated relative path Rr corresponding to the N-number absolute positions (GPS measured values). At operation S188, the distance-correction-value calculator 224 calculates a rotated relative path Rr' resulting from matching the centroid G' on the rotated relative path with the centroid G of the absolute positions, as depicted in FIG. 16B.

At operation S190, the distance-correction-value calculator 224 sets the value of a variable ϵ representing a scale factor to a minimum scale factor sa that is set in advance. The minimum scale factor sa is equal to, for example, 0.5. A maximum scale factor tb of the value of the variable ϵ is also set in advance and is equal to, for example, 2.0.

Figure 17A:
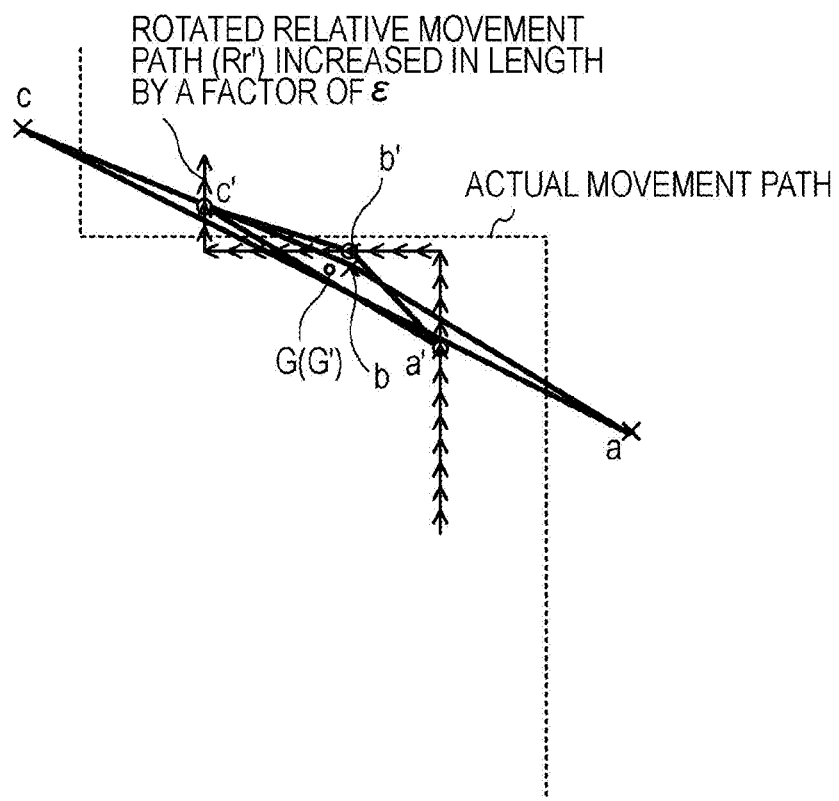
FIGS. 17A and 17B are other diagrams illustrating the processing in FIG. 15.
Figure 17B:
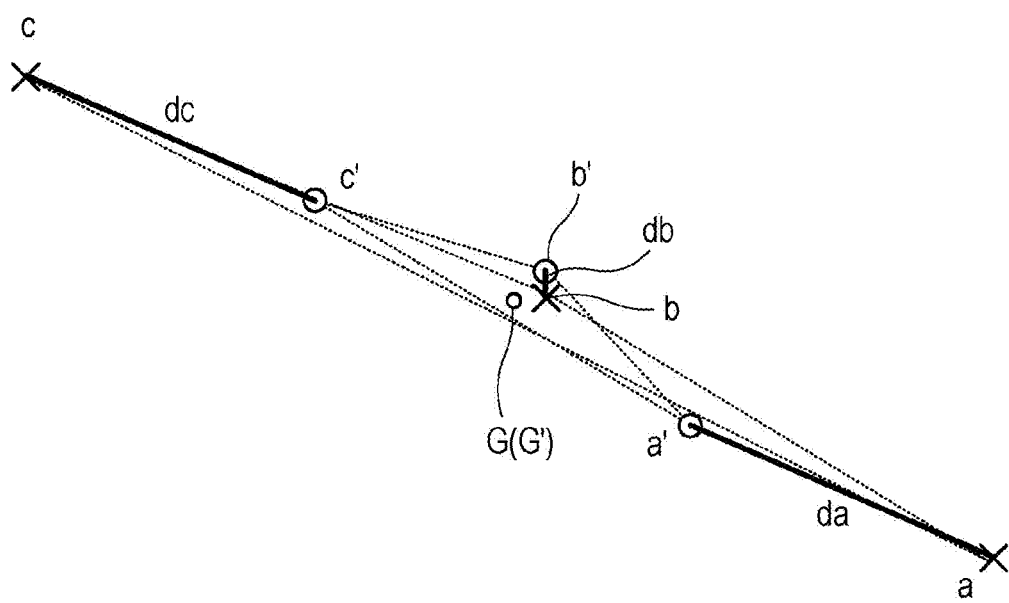

At operation S192, the distance-correction-value calculator 224 increases the length of the rotated relative path Rr' by a factor of ϵ (0.5) with the two centroids being matched with each other (with no shift between the two centroids), as depicted in FIG. 17A. Then, the distance-correction-value calculator 224 calculates the sum of the distances (a distance da between the points a and a' and a distance db between the points b and b', and a distance dc between the points c and c' depicted in an enlarged manner in FIG. 17B) between the N-number absolute positions (GPS measured values) and the corresponding points on the rotated relative path Rr' that is increased by a factor of ϵ.

At operation S194, the distance-correction-value calculator 224 increments the value of the variable ϵ by Δ (Δ is equal to, for example, 0.1). At operation S196, the distance-correction-value calculator 224 determines whether the value of the variable ϵ is not higher than the maximum scale factor tb. If the determination at operation S194 is affirmative, the process goes back to Operation S192. Then, the sum of the distances da, db, and dc is calculated while the value of the variable ϵ is increased by Δ.

If the value of the variable ϵ exceeds the maximum scale factor tb, the determination at operation S196 is negative and the process goes to Operation S198. At operation S198, the distance-correction-value calculator 224 determines a scale factor ϵ' having the smallest sum of the distances da, db, and dc and sets the determined scale factor ϵ as the distance correction value. Then, the process goes to Operation S136 in FIG. 8. The determined distance correction value ϵ' is stored in the correction-value storage 24 in FIG. 1.

After the distance correction value is calculated, a subroutine to calculate a coordinate correction value at operation S136 (refer to FIG. 8) is executed according to operation charts in FIGS. 18 to 20.

Referring to FIG. 18, at operation S202, the coordinate-correction-value calculator 226 rotates the relative path by the direction correction value β' and extends or reduces the relative path by the distance correction value ϵ' to calculate a relative path (Rr"). The relative path Rr" is depicted in FIG. 21.

At operation S204, the coordinate-correction-value calculator 226 calculates a centroid G (refer to FIG. 21) of the absolute positions (three points here) (GPS measures values). The centroid G is calculated at operation S184 in FIG. 15 may be stored and read out.

At operation S206, the coordinate-correction-value calculator 226 calculates a centroid G" (refer to FIG. 21) of the N-number points (three points (a', b', c')) on the relative path Rr" N-number corresponding to the N-number absolute positions (GPS measured values) (three points (a, b, c)).

Figure 21:
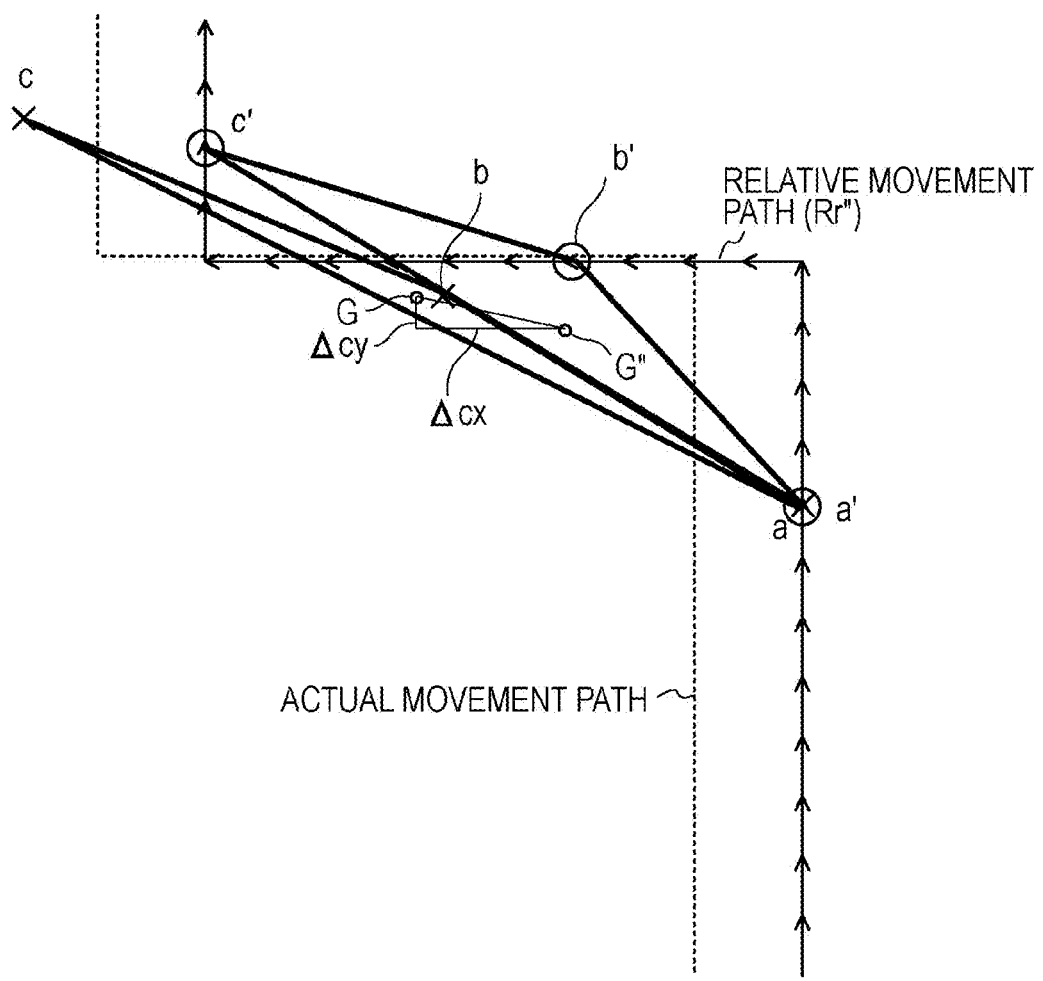
FIG. 21 illustrates the processing at operations S208 to S212 in FIG. 18.

At operation S208, the coordinate-correction-value calculator 226 calculates differences (Δcx, Δcy) depicted in FIG. 21 (Δcx denotes the difference on the X axis and the Δcy denotes the difference on the Y axis) between the centroid G of the absolute positions (GPS measured values) and the centroid G" on the relative path Rr". In addition, the coordinate-correction-value calculator 226 calculates a relative path Rr"' resulting from matching the centroid G" on the relative path Rr" with the centroid G.

At operation S210, a subroutine to calculate a coordinate correction value in the X axis direction is executed according to an operation chart in FIG. 19.

Referring to FIG. 19, at operation S220, the coordinate-correction-value calculator 226 substitutes—(GPS error radius r) for the initial value of a movement width deltx. At operation S222, the coordinate-correction-value calculator 226 adds the movement width deltx to the X coordinates of the N-number points (three points a', b', and c) on the relative path Rr"' (shifts the relative path Rr"' in the X axis direction) to calculate the sum of the distances between the N-number points on the relative path Rr" and the N-number absolute positions (GPS measured values) (three points a, b, and c).

At operation S224, the coordinate-correction-value calculator 226 increments the movement width deltx by dx. The dx in this case is set to, for example, a value of 0.1.

At operation S226, the coordinate-correction-value calculator 226 determines whether the movement width deltx is not larger than the GPS error radius (+r). If the determination at operation S226 is affirmative, the process goes back to Operation S222 to calculate the sum of the distances between the points a and a', the points b and b', and the points c and c'while increasing the movement width deltx to shift the relative path Rr"'.

If the determination at operation S226 is negative, the coordinate-correction-value calculator 226 identifies the movement width deltx having the smallest sum of the distances (hereinafter denoted by deltx') and sets a value resulting from addition of Δcx to deltx' (Δcx+deltx') as the X-axis-direction coordinate correction value at operation S228. The X-axis-direction coordinate correction value (Δcx+deltx') is stored in the correction-value storage 24 in FIG. 1. Then, the process goes to Operation S212 in FIG. 18.

At operation S212, a subroutine to calculate a coordinate correction value in the Y axis direction is executed according to an operation chart in FIG. 20.

Referring to FIG. 20, at operation S240, the coordinate-correction-value calculator 226 calculates a relative path Rr"" resulting from correction of the relative path Rr"' with the X-axis-direction coordinate correction value (Δcx+deltx').

At operation S242, the coordinate-correction-value calculator 226 substitutes—(GPS error radius r) for the initial value of a movement width delty. At operation S244, the coordinate-correction-value calculator 226 adds the movement width delty to the Y coordinates of the N-number points (three points a', b', and c') on the relative path Rr""(shifts the relative path Rr"" in the Y axis direction) to calculate the sum of the distances between the N-number points on the relative path Rr"" and the N-number absolute positions (GPS measured values) (three points a, b, and c).

At operation S246, the coordinate-correction-value calculator 226 increments the movement width delty by dy. The dy in this case is set to, for example, a value of 0.1.

At operation S248, the coordinate-correction-value calculator 226 determines whether the movement width delty is not larger than the GPS error radius (+r). If the determination at operation S248 is affirmative, the process goes back to Operation S244 to calculate the sum of the distances between the points a and a', the points b and b', and the points c and c'while increasing the movement width delty to shift the relative path Rr"".

If the determination at operation S248 is negative, then at operation S250, the coordinate-correction-value calculator 226 identifies the movement width delty having the smallest sum of the distances (hereinafter denoted by delty') and sets a value resulting from addition of Δcy to delty' (Δcy+delty') as the Y-axis-direction coordinate correction value. The Y-axisdirection coordinate correction value (Δcy+delty') is stored in the correction-value storage 24 in FIG. 1. Since all the steps in FIG. 18 (at operation S136 in FIG. 8) are terminated, the process goes to Operation S138 in FIG. 8. In the operation chart in FIG. 18, steps S210 and S212 may be executed in reverse.

Figure 22:
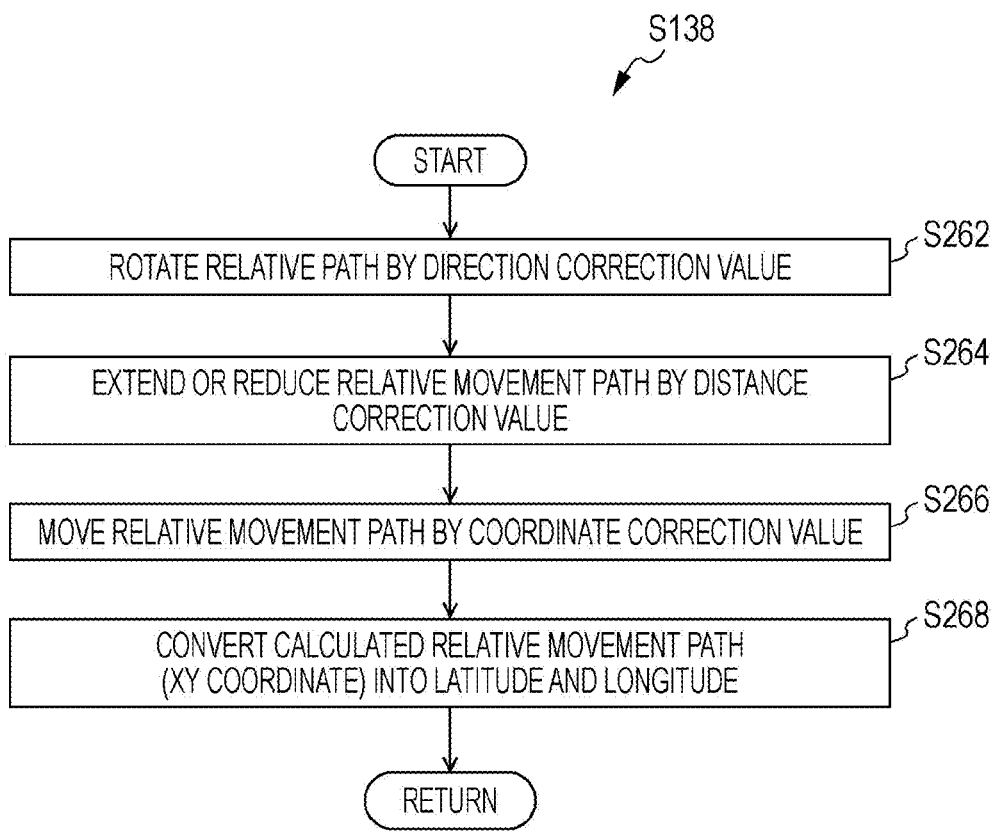
FIG. 22 is an operation chart depicting operation S138 in FIG. 8 in detail.

At operation S138, a subroutine for conversion into an absolute coordinate is executed according to an operation chart in FIG. 22.

Referring to FIG. 22, at operation S262, the correction value applier 228 rotates the relative path Rr by the direction correction value β'. The rotation in this case can use Expression (9) and (10) described above. If the direction correction value is equal to 90°, the coordinate values x and y in the table in FIG. 5 are converted into values depicted in FIG. 23A.

At operation S264, the correction value applier 228 extends or reduces the relative path subjected to the rotation at operation S262 by the distance correction value ϵ'. In this case, the value of each coordinate point on the rotated relative path may be integrated with the distance correction value ϵ'. If the distance correction value ϵ' is equal to, for example, 1.1 in this step, the coordinate values x and y in FIG. 23A are converted into values depicted in FIG. 23B.

At operation S266, the correction value applier 228 moves in parallel the relative path extended or reduced at operation S264 by the coordinate correction values (Δcx+deltx' and Δcy+delty') (adds the coordinate correction values to the coordinate values). If the Δcx+deltx' is equal to −0.2 and Δcy+delty' is equal to −2.0 in this operation, the coordinate values x and y in FIG. 23B are converted into values depicted in FIG. 24A.

At operation S268, the coordinate converting part 20 converts the relative path corrected at operations S262 to S266 into a longitude and latitude. Since the relative path subjected to the correction is still represented by the XY coordinate values depicting the distance, Expression (11) and (12) can be used to convert the relative path into a longitude and latitude, as depicted in FIG. 9:

$$\lambda_i = \Delta x/(A \times \cos \phi_0) + \lambda_0 \quad (11)$$

$$\phi_i = \Delta y/A + \phi_0 \quad (12)$$

where ($\lambda_0$, $\phi_0$) denote the longitude and latitude of the first absolute position a, which is used in the conversion of the absolute coordinate into the relative coordinate and is stored in the correction-value storage 24. ($\lambda_0$, $\phi_0$) are read out from the correction-value storage 24 and the readout ($\lambda_0$, $\phi_0$) are used in this operation.

The above processing converts the coordinate values x and y in FIG. 24A into longitudes and latitudes, as depicted in FIG. 24B.

Since all the steps in FIG. 8 are terminated when the subroutine in FIG. 22 is terminated up to Operation S268, Operation S22 in FIG. 2 is terminated and, then, the process goes to Operation S24.

Referring back to FIG. 2, at operation S24, the path-information storage 26 (refer to FIG. 1) stores information about the path (the absolute movement path) converted by the coordinate converting part 20. The path information at least includes the time, the longitude information, and the latitude information, among the values depicted in FIG. 24B.

At operation S28, the absolute-position acquiring part 18 resets the number of absolute positions. At operation S30, the relative-path calculating part 16 resets the relative path information. At operation S32, the movement-distance calculating part 14 determines whether the user is walking. If the determination at operation S32 is affirmative, the process goes back to Operation S10. If the determination at operation S32 is negative, the process in FIG. 2 is terminated.

If the determination at operation S14 is negative during the above processing (if the user stops walking), a stop-of-walking process surrounded by a broken line in FIG. 2 is executed.

In the stop-of-waking process, at operation S34, the relative-path calculating part 16 determines whether the relative path information exists. If the determination at operation S34 is negative, the stop-of-walking process is terminated. If the determination at operation S34 is affirmative, the process goes to Operation S36.

At operation S36, it is determined whether the correction values and the reference absolute coordinate exist. If the determination at operation S36 is negative, the stop-of-walking process is terminated. If the determination at operation S36 is affirmative, the process goes to Operation S38.

At operation S38, the correction value applier 228 corrects the relative path coordinate with the correction values stored in the correction-value storage 24 and the coordinate converting part 20 converts the relative path coordinate subjected to the conversion into the absolute coordinate.

At operation S40, the path information (the absolute coordinate) resulting from the conversion at operation S38 is stored in the path-information storage 26. At operation S42, the relative-path calculating part 16 resets the relative path information. Then, the stop-of-walking process is terminated.

The path information (the absolute movement path) acquired in the above processing is displayed on the screen of the mobile telephone 100 each time the path information is updated or is appropriately displayed on the screen of the mobile telephone 100 in response to an instruction from the user.

As described above, according to the first embodiment, the relative path of the user is calculated from the direction that is depicted by the reference axis defined for the mobile telephone 100 in advance and that is detected by the geomagnetic sensor 30 and the detected movement distance of the user (the number of steps of the user, which is calculated from the step length that is set in advance×the acceleration). In addition, the absolute position of the mobile telephone 100 indicated by an absolute coordinate is measured by using the GPS each time the user walks a given number of steps (for example, eight steps). If the number of the measured absolute positions reaches a given value (for example, three), the correction values (β', ϵ', Δcx×deltx, and Δy×delty) are calculated from the relationship between the absolute positions (a, b, and c) and the relative positions (a', b', and c') on the relative path at the time when the absolute positions are measured to calculate the absolute movement path of the user indicated by the absolute coordinate from the correction values and the relative path.

Since the correction values used for bringing the relative path close to the actual movement path (the absolute movement path) can be calculated from the relationship between the absolute positions (a, b, and c) and the relative positions (a', b', and c') corresponding to the absolute positions in the above manner, it is possible to accurately calculate the absolute movement path of the user regardless of how the terminal is carried by the user (for example, in the case in which the direction in which the user is moving is different from the direction depicted by the mobile telephone).

According to the first embodiment, the measurement of the absolute positions by the GPS is performed each time the movement distance of the user reaches a given value (the threshold value M). Accordingly, it is possible to acquire the absolute positions and to correct the relative path with the absolute positions at appropriate timing.

According to the first embodiment, the relative path is acquired and the absolute positions of a given number (for example, three) are acquired while the user walks a given number of steps (for example, 24 steps) to correct the relative path with the correction values calculated by using the absolute positions of the given number and the relative positions corresponding to the absolute positions. When the user walks another given number of steps (another 24 steps), the relative path that is newly acquired is corrected with the correction values that are newly calculated from the absolute positions of the given number acquired during the walking. Since the relative path can be constantly corrected with the new correction values that are recently updated in the above manner in the first embodiment, it is possible to realize the accurate correction of the relative path.

According to the first embodiment, since the direction correction value used for correcting the direction, the distance correction value used for correcting the movement distance, and the coordinate correction value used for correcting the coordinate value are calculated, the rotation, the extension or reduction, and the parallel movement to bring the relative path close to the absolute movement path can be easily performed. Accordingly, it is possible to accurately correct the relative path. The correction values are not restricted to the above three values, and various correction values may be used as long as the correction values are calculated from at least two absolute positions and the relative positions corresponding to the absolute positions. For example, if either of the direction and the distance can be accurately measured with no error, either of the direction correction value and the distance correction value may not be used.

According to the first embodiment, the relative path is rotated so that the azimuth of the corresponding two relative positions is within the absolute-position azimuth range (larger than $(\kappa-\alpha)$ and smaller than $(\kappa+\alpha)$) calculated from the azimuth $\kappa$ between the two absolute positions having the largest distance therebetween and the measurement error in the absolute positions, and the rotation angle $\beta'$ causing the sum of the angles between the sides of a graphic resulting from connection of the absolute positions and the corresponding sides of a graphic resulting from connection of the relative positions corresponding to the absolute positions to be minimized is used as the direction correction value. Accordingly, it is possible to determine the value suitable for the direction correction value even if a measurement apparatus, such as the GPS, in which an error in the absolute position occurs, is used.

According to the first embodiment, the relative path is rotated by the direction correction value $\beta'$, a graphic resulting from connection of the relative positions corresponding to the measured absolute positions is extended or reduced with the centroid G of a graphic resulting from connection of the absolute positions being matched with the centroid G' of the graphic resulting from connection of the relative positions corresponding to the absolute positions to calculate the scale factor $\epsilon'$ of extension and reduction causing the sum of the distances between the absolute positions and the relative positions corresponding to the absolute positions to be minimized, and the scale factor $\epsilon'$ is used as the distance correction value. Accordingly, it is possible to determine the value suitable for the distance correction value even if a measurement apparatus, such as the GPS, in which an error in the absolute position occurs, is used.

According to the first embodiment, the amount of movement ($\Delta cx$, $\Delta cy$) necessary to match the centroid G of a graphic resulting from connection of the absolute positions with the centroid G' of a graphic resulting from connection of the relative positions corresponding to the absolute positions is calculated in the state in which the relative path is rotated by the direction correction value $\beta'$ and the relative path is extended or reduced by the distance correction value $\epsilon'$ to determine the minute amount of movement (deltx', delty') of the relative path necessary to minimize the sum of the distances between the absolute positions and the relative positions corresponding to the absolute positions in the state in which the centroid G is matched with the centroid G'. Then, the sum of the amount of movement ($\Delta cx$, $\Delta cy$) and the minute amount of movement (deltx', delty') is used as the corresponding correction value. Accordingly, it is possible to determine the value suitable for the coordinate correction value even if a measurement apparatus, such as the GPS, in which an error in the absolute position occurs, is used.

(First Modification Concerning Detection Process)

Although the absolute positions are acquired (measured) when the movement distance reaches a given value (the number of steps reaches the threshold value M) in the above first embodiment, the acquisition of the absolute positions is not restricted to the above method. For example, the absolute positions may be detected when the amount of variation in direction reaches a given value (for example, 90°) because the user turns a corner. In this case, the absolute positions may be detected if either of the number of steps (the movement distance) and the amount of variation in direction exceeds a given value. Alternatively, for example, the absolute positions may be detected for every given time period. It is possible to detect the absolute positions at appropriate time intervals by any of the above methods.

(Second Modification Concerning Detection Process)

Although the relative path that is created at a time when the user walks a given number of steps (for example, 24 steps) is corrected with the correction values calculated from the relative path to calculate the absolute movement path (that is, the absolute movement path is not calculated before the user walks the given number of steps (for example, 24 steps)) in the above first embodiment, the method of calculating the absolute movement path is not restricted to the above one. For example, a process depicted in an operation chart in FIG. 25 may be performed, instead of the process in FIG. 2.

Figure 25:
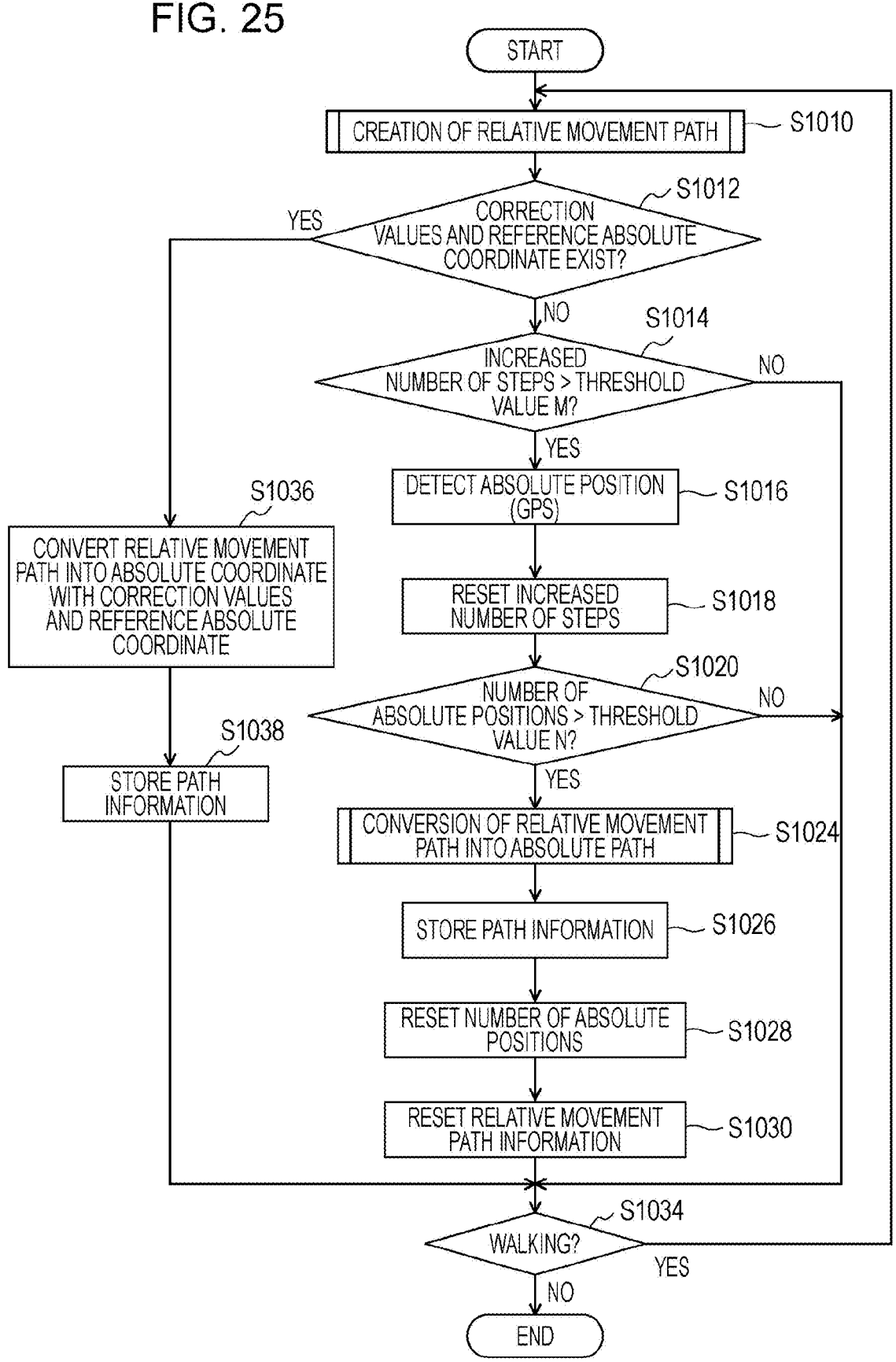
FIG. 25 is an operation chart depicting a second modification concerning a detection process.

Referring to FIG. 25, at operation S1010, the creation of a relative path is performed in the same manner as at operation S10 in FIG. 2. At operation S1012, it is determined whether the correction values and absolute coordinate values exist in the correction-value storage 24. If the determination at operation S1012 is negative, then at operation S1014, it is determined whether the increased number of steps exceeds the threshold value M, as at operation S12 in FIG. 2. If the determination at operation S1014 is negative (the increased number of steps does not exceed the threshold value M), then at operation S1034, it is determined whether the user is walking. If the determination at operation S1034 is affirmative, the process goes back to Operation S1010. In other words, the processing and determination at operations S1010, S1012, S1014, and S1034 are repeated until the increased number of steps exceeds the threshold value M.

If the determination at operation S1014 is affirmative, at operations S1016 and S1018, the same processing as at operations S16 and S18 in FIG. 2 (detection of the absolute positions and resetting of the increased number of steps) is performed.

At operation S1020, it is determined whether the number of absolute positions exceeds the threshold value N (for example, N is equal to two), as at operation S20 in FIG. 2. If the determination at operation S1020 is negative, then at operation S1034, it is determined whether the user is walking. Then, the above processing is repeated.

If the number of absolute positions exceeds the threshold value N (=2) at operation S1020, the process goes to Operation S1024. At operation S1024, the same processing as at operation S22 in FIG. 2 (conversion of the relative path into the absolute path) is performed. At operation S1026, the correction values and the reference absolute coordinate are stored in the correction-value storage 24.

At operations S1028 and S1030, the same processing as at operations S28 and S30 in FIG. 2 (the reset processing) is performed. At operation S1034, it is determined whether the user is walking.

According to this modification, after the correction values and the reference absolute coordinate are stored in the correction-value storage 24 at operation S1026, the determination at operation S1012 is affirmative. Subsequently, at operation S1036, the relative path is converted into the absolute coordinate with the correction values and the reference absolute coordinate stored in the correction-value storage 24. At operation S1038, information about the path resulting from the conversion (the absolute movement path) is stored in the path-information storage 26.

As described above, since the correction values and the reference absolute coordinate that are calculated once are repeatedly used in the subsequent operations before the user stops walking, it is possible to reduce the amount of calculation, compared with the case in which the correction values and the reference absolute coordinate are updated each time the relative path is created. In addition, since the conversion into the absolute coordinate can be performed each time the relative path is created, it is possible to acquire the absolute path substantially in real time.

Instead of the above method, for example, the absolute movement path may be temporarily updated substantially in real time with the correction values and the reference absolute coordinate that are calculated before another N-number absolute positions are accumulated. In this case, the true absolute movement path may be calculated with new correction values and reference absolute coordinate that are calculated when another N-number absolute positions are accumulated. Then, the temporarily updated absolute movement path may be updated with the true absolute movement path to display the absolute movement path on the screen of the mobile telephone 100.

(Modification of Method of Calculating Direction Correction Value)

Although the method depicted in FIGS. 10 to 14C is adopted to calculate the direction correction value in the first embodiment, the method of calculating the direction correction value is not restricted to the above one. For example, if the GPS measured values have no measurement error, the direction correction value may be calculated according to an operation chart in FIG. 26.

Figure 26:
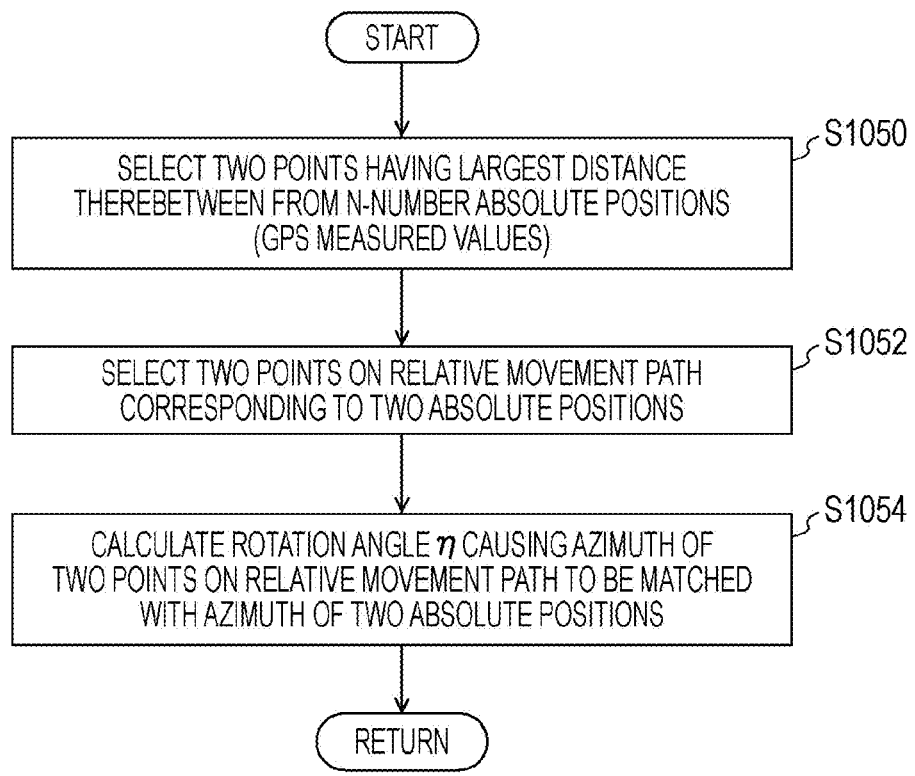
FIG. 26 is an operation chart depicting a modification of a method of calculating the direction correction value.
Figure 27:
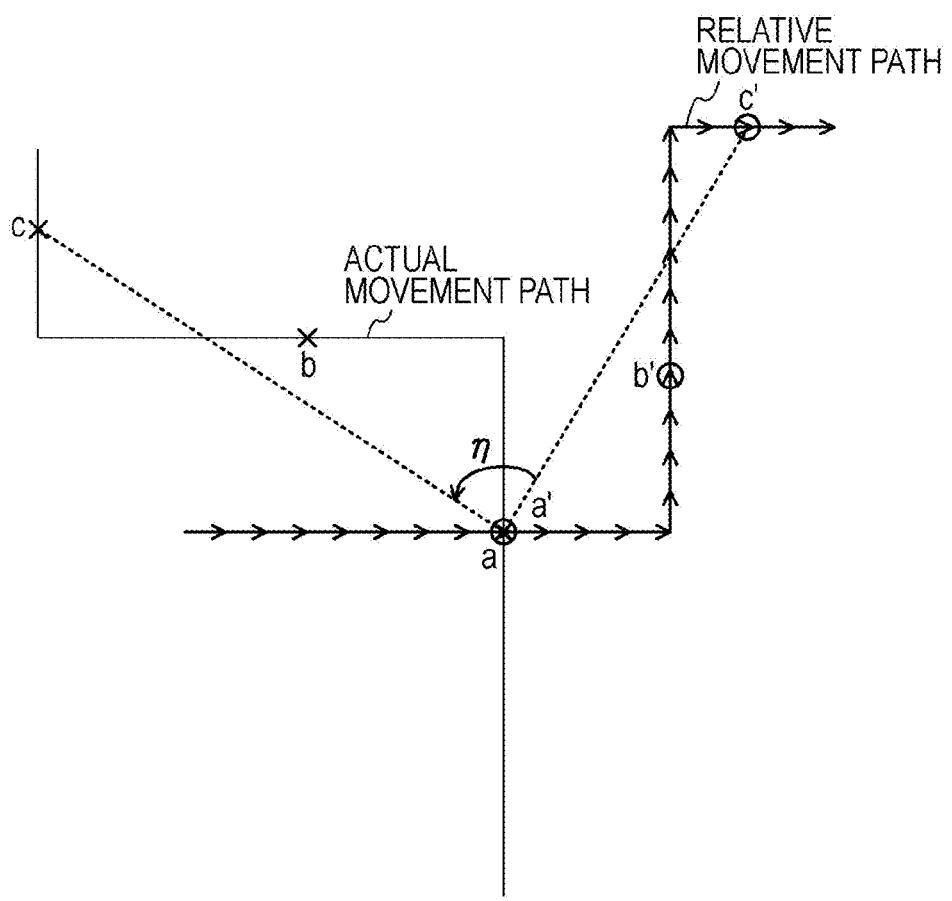
FIG. 27 illustrates the processing in FIG. 26.

Referring to FIG. 26, at operation S1050, two points (points a and c depicted in FIG. 27) having the largest distance therebetween are selected from the absolute positions (GPS measured values) of N number (for example, three). At operation S1052, two points (points a' and c' depicted in FIG. 27) on the relative path corresponding to the two absolute positions having the largest distance therebetween are selected. At operation S1054, a rotation angle η causing the azimuth of the two points (the points a' and c') on the relative path to be matched with the azimuth of the two absolute positions (the points a and c) is calculated and the calculated rotation angle η is set as the direction correction value. The adoption of the above method of calculating the direction correction value allows the direction correction value to be accurately and easily calculated if no measurement error occurs.

(First Modification of Method of Calculating Distance Correction Value)

Figure 28:
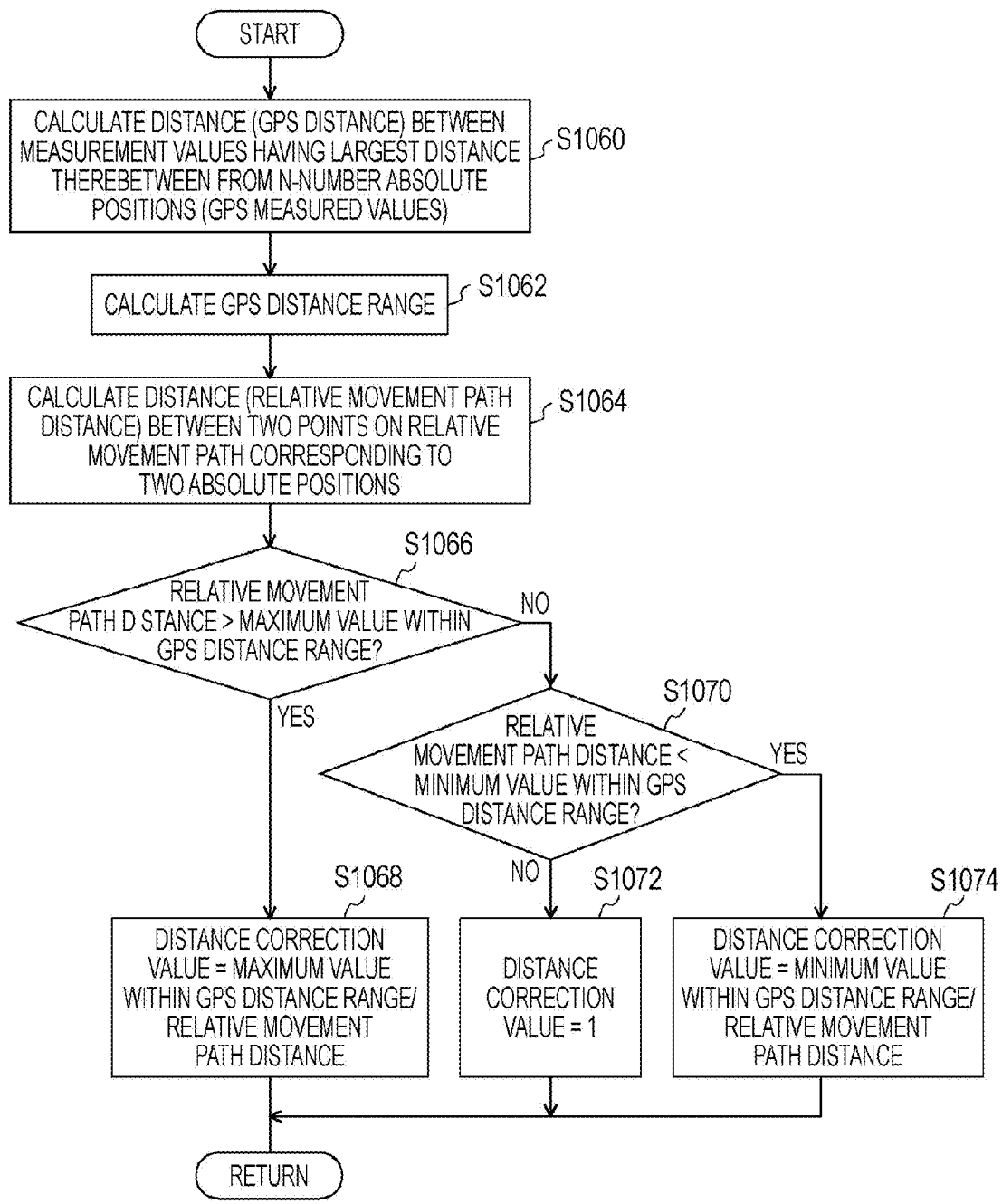
FIG. 28 is an operation chart depicting a first modification concerning a method of calculating the distance correction value.

Although the distance correction value $\epsilon'$ is calculated by the method depicted in FIGS. 15 to 17B in the first embodiment, the distance correction value may be calculated according to an operation chart in FIG. 28.

Figure 29A:
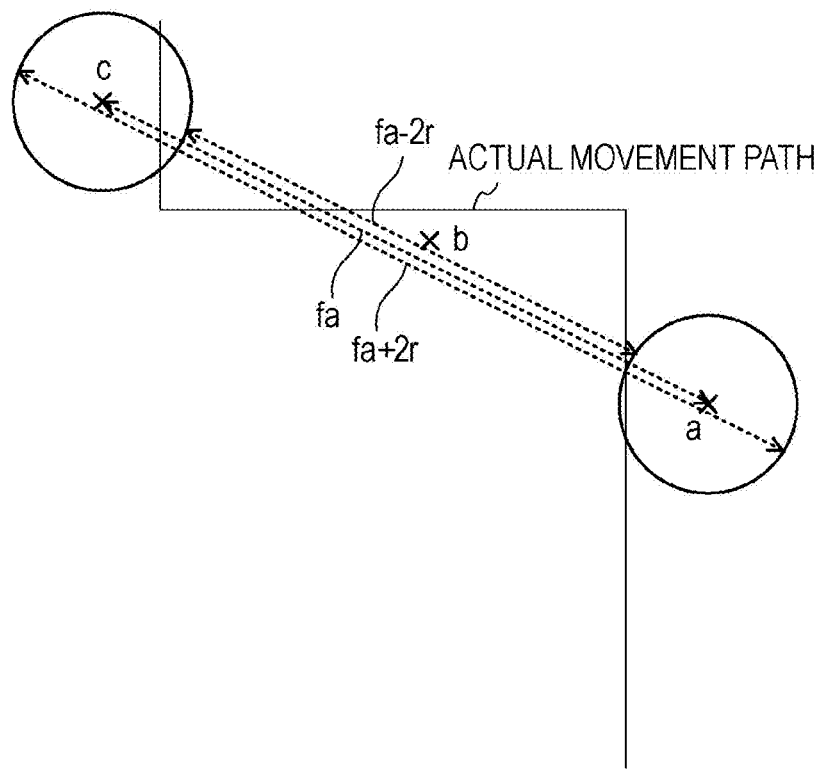
FIGS. 29A and 29B illustrate the processing in FIG. 28.

Referring to FIG. 28, at operation S1060, the distance-correction-value calculator 224 selects two absolute positions (points a and c in FIG. 29A) having the largest distance therebetween from the N-number absolute positions (GPS measured values) and calculates a distance fa between the points.

At operation S1062, the distance-correction-value calculator 224 calculates a GPS distance range. Since the GPS error range has a radius r in this case, the GPS distance range is expressed by Expression (13):

$$fa-2r \leq \text{GPS distance range} \leq fa+2r \quad (13)$$

The GPS distance range means a range including correct distances calculated from the GPS error range.

Figure 29B:
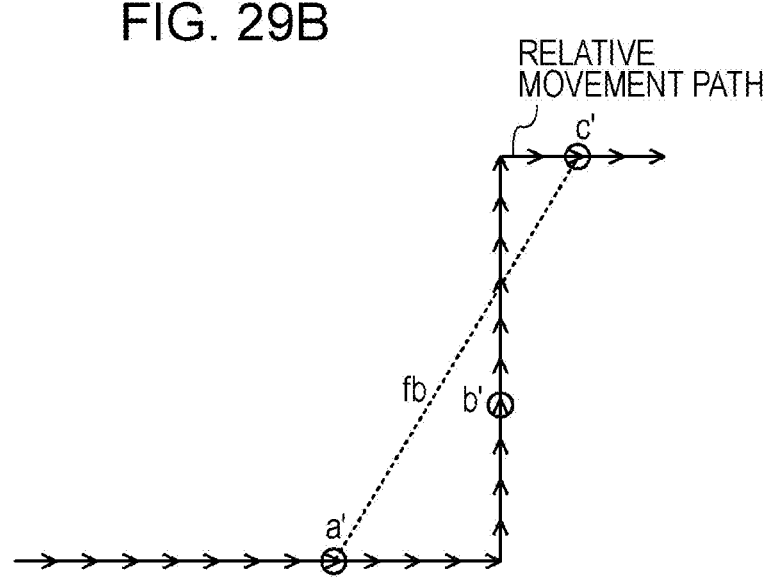

At operation S1064, the distance-correction-value calculator 224 calculates the relative positions when the two absolute positions are measured, that is, the distance (relative path distance) between the two points on the relative path corresponding to the two absolute positions. A distance fb between points a' and c' depicted in FIG. 29B is calculated here.

At operation S1066, the distance-correction-value calculator 224 compares the relative path distance fb with a maximum value (fa+2r) within the GPS distance range to determine whether the relative path distance fb exceeds the maximum value (fa+2r) within the GPS distance range. If the determination at operation S1066 is affirmative, then at operation S1068, the distance-correction-value calculator 224 calculates the distance correction value $\epsilon'$ according to Expression (14):

$$\epsilon'=(fa+2r)/fb \quad (14)$$

If the determination at operation S1066 is negative, then at operation S1070, the distance-correction-value calculator 224 compares the relative path distance fb with a minimum value (fa−2r) within the GPS distance range to determine whether the relative path distance fb is smaller than the minimum value (fa−2r) within the GPS distance range. If the determination at operation S1070 is negative, then at operation S1072, the distance-correction-value calculator 224 sets the distance correction value E' to one. Although the distance correction value is set to one here, the value of the distance correction value is not restricted to one. For example, a value given by dividing the GPS distance (fa) by the relative path distance (fb) may be used as the distance correction value $\epsilon'$.

If the determination at operation s1070 is affirmative, then at operation S1074, the distance-correction-value calculator 224 calculates the distance correction value $\epsilon'$ according to Expression (15):

$$\epsilon'=(fa-2r)/fb \quad (15)$$

Since the method of calculating the distance correction value $\epsilon'$ is varied in accordance with the relationship between the GPS distance range and the relative path distance also in the above method, it is possible to appropriately calculate the distance correction value.

(Second Modification of Method of Calculating Distance Correction Value)

Figure 30A:
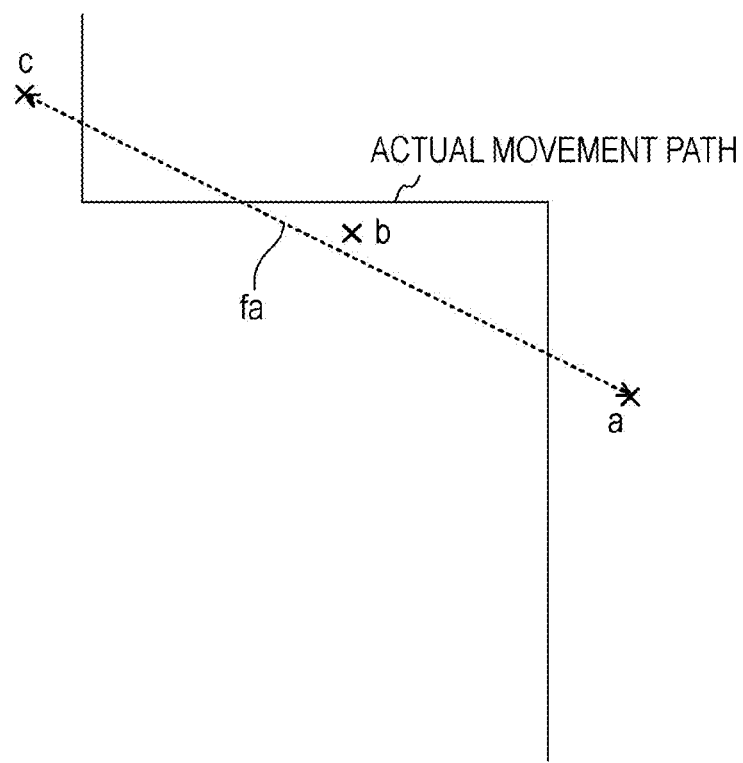
FIGS. 30A and 30B correspond to FIG. 29 in a second modification concerning the method of calculating the distance correction value.
Figure 30B:
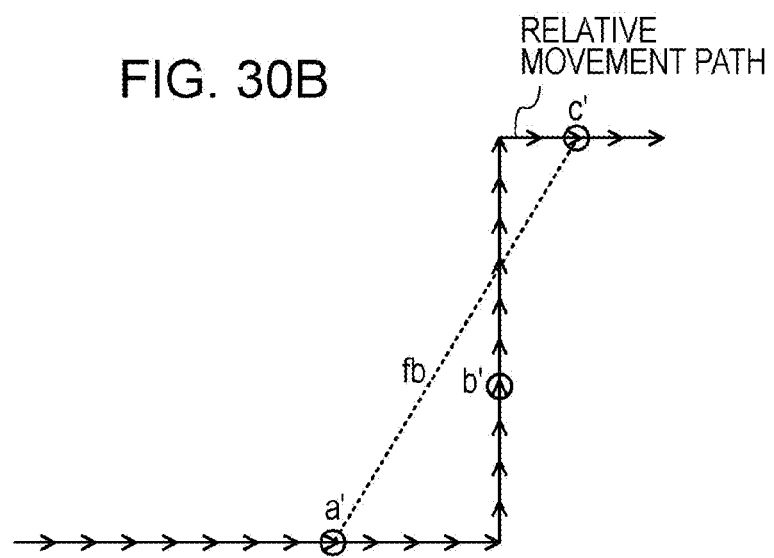

The method of calculating the distance correction value is not restricted to the above first embodiment and the above first modification. For example, if the GPS measured values have no measurement error, the distance correction value may be calculated in a manner depicted in FIGS. 30A and 30B.

Specifically, there is no need to consider the GPS distance range if the GPS measured values have no measurement error. Accordingly, in such a case, the distance (GPS distance) Fa between points A and C may be calculated in a manner depicted in FIG. 30A and the distance (relative path distance) fb between points a' and c' may be calculated in a manner depicted in FIG. 30B to calculate the distance correction value ϵ' from these values according to Expression (16):

$$\epsilon' = fa/fb \quad (16)$$

The adoption of the above method of calculating the distance correction value allows the distance correction value to be easily and accurately calculated if no measurement error occurs.

(Modification of Method of Calculating Coordinate Correction Value)

Although the method depicted in FIGS. 18 to 21 is adopted to calculate the coordinate correction value in the above first embodiment, the method of calculating the coordinate correction value is not restricted to the above one. For example, if the GPS measured values have no measurement error, the difference ($\Delta cx$, $\Delta cy$) between the centroid G calculated at operation S204 in FIG. 18 and the centroid G" calculated at operation S206 in FIG. 18 may be set as the coordinate correction value.

Although the conversion of the relative path into the absolute path (at operation S22) is performed if the number of absolute positions exceeds the threshold value, two, that is, the number of absolute positions is equal to three at operation S20 in FIG. 2 in the above first embodiment, the conversion of the relative path into the absolute path is not restricted to the above one. The threshold value may be equal to one. Specifically, the conversion of the relative path into the absolute path (at operation S22) may be performed if the number of absolute positions is equal to two. In this case, the centroid of the absolute positions (or the relative positions) coincides with the midpoint of the two points. Alternatively, for example, the process may proceed to Operation S22 if the number of absolute positions is equal to four or five. In this case, although the triangle used in the comparison in FIGS. 13B, 16A, 16B, 17A, 17B, and 21 is changed to a quadrangle or pentagon, the same method as in the above first embodiment may be adopted for the comparison in the angle (and the sum of the angles) between the sides and in the distance between the points.

Although the threshold value M of the number of steps is set to eight in the above first embodiment, the threshold value M is not restricted to eight and various values may be set as the threshold value M. In this case, the threshold value M may be varied depending on the situations. For example, the threshold value M may be increased if the number of steps since start of walking is small.

Second Embodiment

A second embodiment of the present invention will herein be described in detail with reference to FIGS. 31 to 38.

Figure 31:
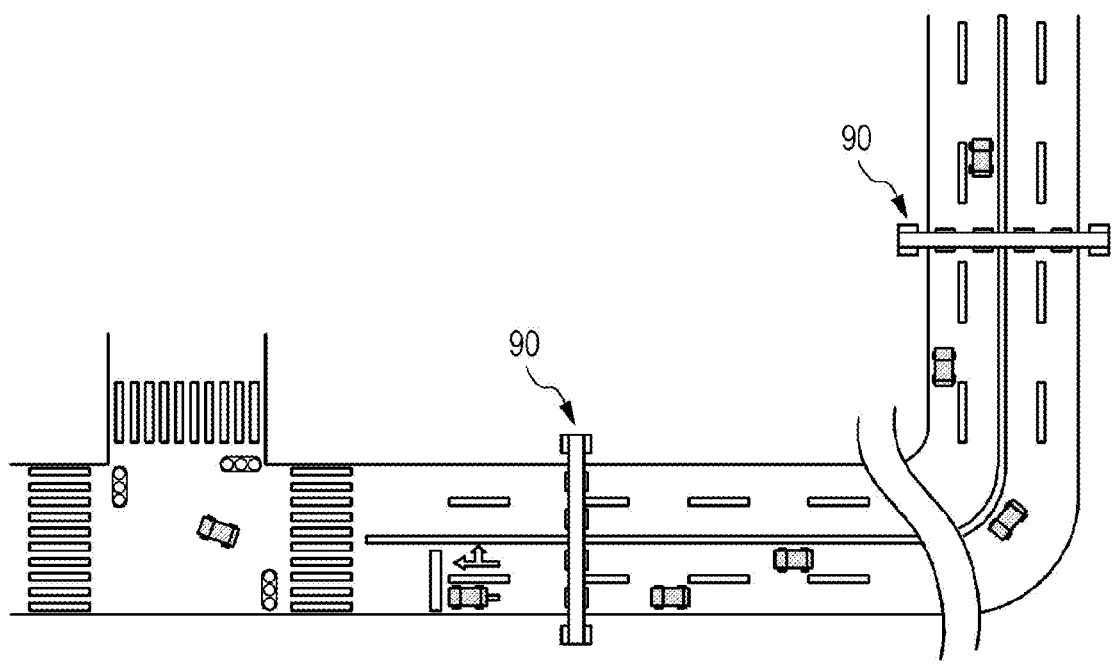
FIG. 31 schematically depicts an advanced safety service system according to a second embodiment of the present invention.

FIG. 31 illustrates an example of an advanced safety service system that locates the position of a vehicle on a road to perform provision of information, warning, and intervention control for the vehicle on the basis of the located position. The advanced safety service system includes road-side apparatus (optical beacons) 90 provided on the road. Each optical beacon 90 communicates with an in-vehicle apparatus 60 (refer to FIG. 32), which is a mobile terminal mounted in the vehicle passing below the optical beacon 90. The optical beacon 90 notifies the in-vehicle apparatus 60 of information about the absolute position of the vehicle (information indicating the longitude and latitude of the vehicle and information indicating which lane the vehicle is moving).

Figure 32:
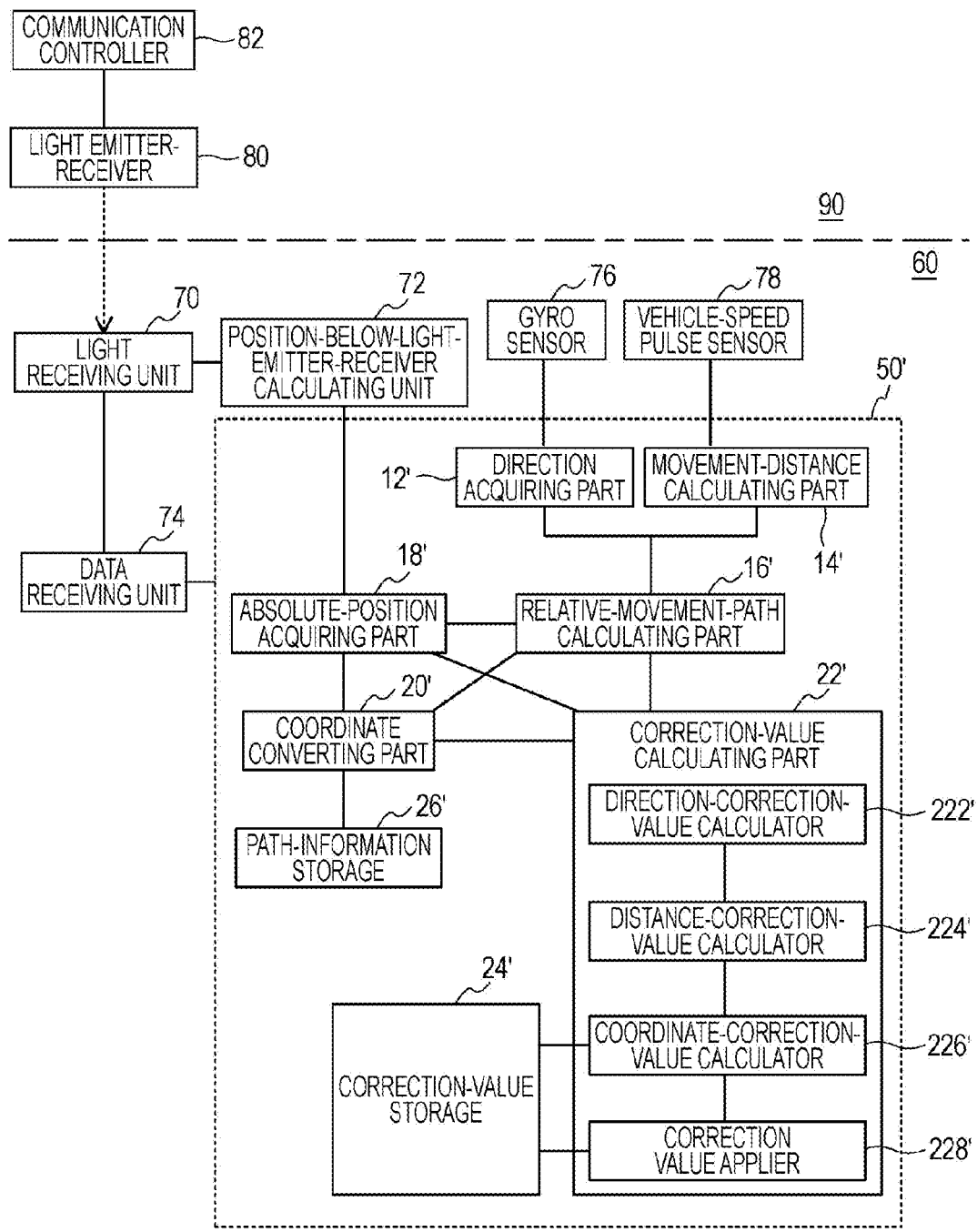
FIG. 32 is a block diagram depicting examples of the configurations of an optical beacon and an in-vehicle apparatus.

FIG. 32 is a block diagram illustrating an example of the configuration of the optical beacon 90 and an example of the configuration of the in-vehicle apparatus 60.

Referring to FIG. 32, the optical beacon 90 includes a light emitter-receiver 80 and a communication controller 82. The light emitter-receiver 80 emits a light signal to the in-vehicle apparatus 60 and receives a light signal emitted from the in-vehicle apparatus 60. The communication controller 82 controls communication with the in-vehicle apparatus 60 via the light emitter-receiver 80.

The in-vehicle apparatus 60 includes a light receiving unit 70, a data receiving unit 74, a position-below-light-emitter-receiver calculating unit 72, a gyro sensor 76, a vehicle-speed pulse sensor 78, and a vehicle-path calculating unit 50' serving as an absolute-movement-path calculating apparatus.

The light receiving unit 70 receives a light signal from the optical beacon 90. The data receiving unit 74 receives a variety of information from the optical beacon 90 via the light receiving unit 70. The position-below-light-emitter-receiver calculating unit 72 extracts information about the absolute position of the optical beacon 90 from data (downlink transmission data) received by the data receiving unit 74 upon calculation (detection) of a vehicle that is immediately below the optical beacon 90 from the reception state of the light in the light receiving unit 70.

The vehicle-path calculating unit 50' calculates the position of the vehicle from the information about the absolute position extracted by the position-below-light-emitter-receiver calculating unit 72 and information about the relative path calculated by using the autonomous navigation from the results of detection in the gyro sensor 76 and the vehicle-speed pulse sensor 78. The vehicle-path calculating unit 50' has an exemplary configuration similar to that of the absolute-movement-path calculating apparatus 50 (refer to FIG. 1) according to the above first embodiment. Reference numerals resulting from addition of "'" to the reference numerals of the components in FIG. 1 are used in FIG. 32 to identify the same or similar components in FIG. 1.

Specifically, the vehicle-path calculating unit 50' includes an absolute-position acquiring part 18', a direction acquiring part 12', a movement-distance calculating part 14', a relative-path calculating part 16', a coordinate converting part 20', a correction-value calculating part 22', a correction-value storage 24', and a path-information storage 26'. The absolute-position acquiring part 18' extracts the absolute position information extracted by the position-below-light-emitter-receiver calculating unit 72 from the data received by the data receiving unit 74. The direction acquiring detecting part 12' acquires the direction of the vehicle by using the gyro sensor 76. The movement-distance calculating part 14' calculates the traveling distance of the vehicle by using the vehicle-speed pulse sensor 78. The relative-path calculating part 16' calculates a relative path from the direction acquired by the direction acquiring detecting part 12' and the distance calculated by the movement-distance calculating part 14'. The coordinate converting part 20' performs inter-conversion between the coordinate system of the absolute position and the coordinate system of the relative path. The correction-value calculating part 22' calculates a correction value from the absolute position acquired by the absolute-position acquiring part 18' and the relative path calculated by the relative-path calculating part 16' and corrects the relative path with the correction value. The path-information storage 26' stores results of conversion of the relative path corrected by the correction-value calculating part 22' into the absolute coordinate by the coordinate converting part 20'.

A process using the in-vehicle apparatus 60 and the optical beacon 90 will now be described with reference to flowcharts in FIGS. 33 to 38. The operation chart in FIG. 33 is started when the movement-distance calculating part 14' detects start of traveling of a vehicle via the vehicle-speed pulse sensor 78.

Figure 33:
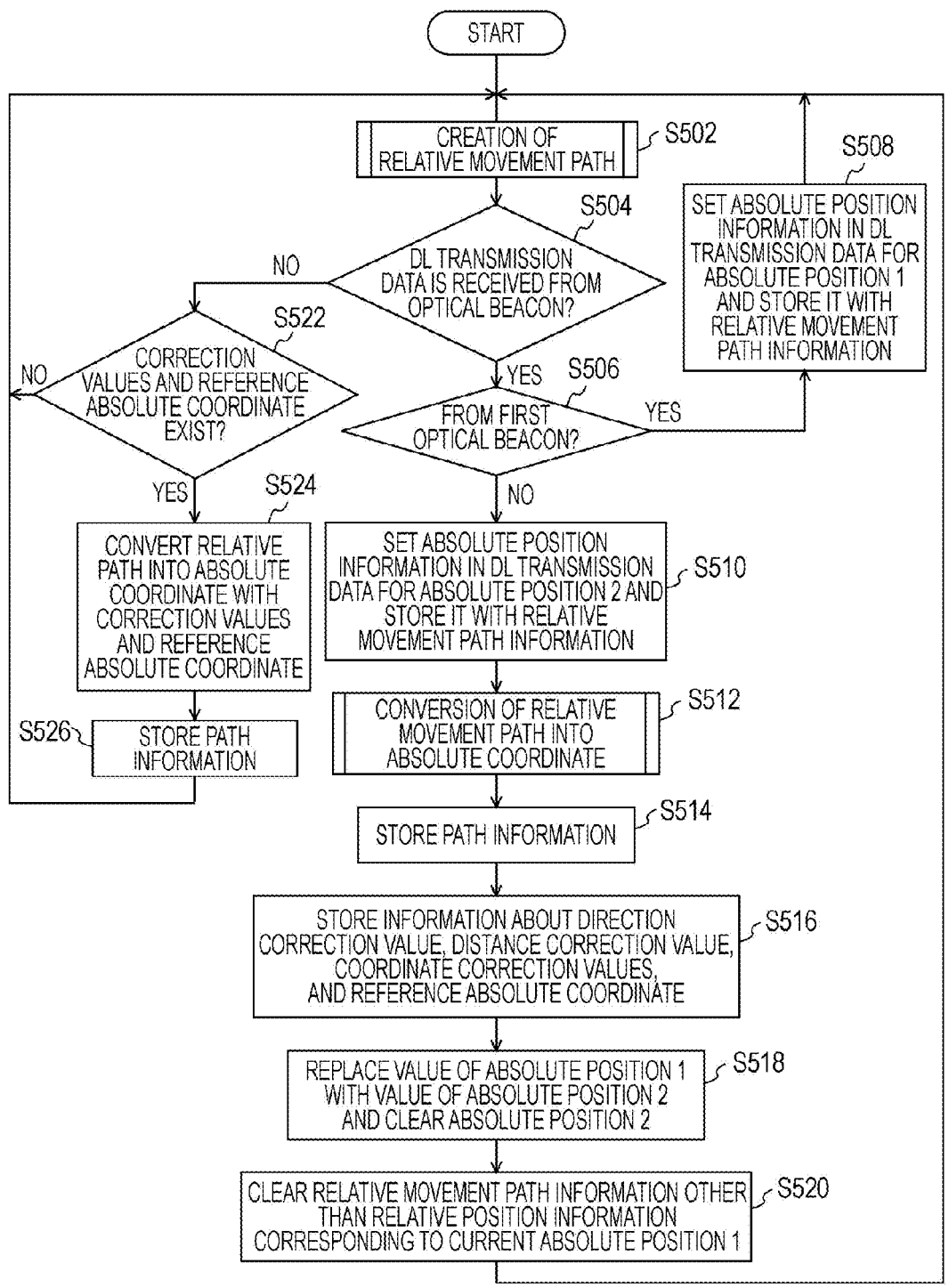
FIG. 33 is an operation chart depicting a process performed by a vehicle-path calculating unit.
Figure 34:
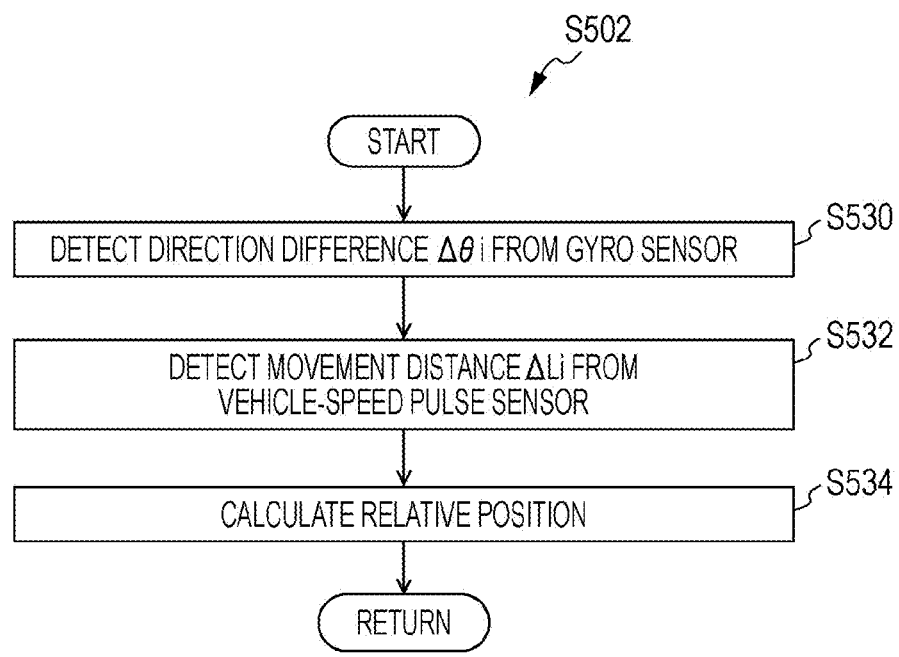
FIG. 34 is an operation chart depicting the processing at operation S502 in FIG. 33 in detail.

Referring to FIG. 33, at operation S502, a subroutine to create a relative path is executed according to an operation chart in FIG. 34. In the subroutine in FIG. 34, at operation S530, the direction acquiring detecting part 12' acquires a direction difference $\Delta\theta_i$ of the vehicle on the basis of the detection result in the gyro sensor 76.

At operation S532, the movement-distance calculating part 14' acquires a movement distance $\Delta L_i$ from the start point of the traveling of the vehicle on the basis of the detection result in the vehicle-speed pulse sensor 78.

At operation S534, the relative-path calculating part 16' calculates the relative position of the vehicle on the basis of the results at operations S530 and S532.

In this case, the current direction $\theta_i$ of the vehicle can be calculated according to Expression (17):

$$\theta_i = \theta_{i-1} + \Delta\theta_i \quad (17)$$

where $\theta_{i-1}$ denotes the previous direction of the vehicle.

In addition, the current relative position $(X_i, Y_i)$ of the vehicle can be calculated according to Expressions (18) and (19):

$$X_i = X_{i-1} + \Delta L_i \cos(90-\theta_i) \quad (18)$$

$$Y_i = Y_{i-1} + \Delta L_i \sin(90-\theta_i) \quad (19)$$

where $(X_{i-1}, Y_{i-1})$ denotes the previous relative position of the vehicle.

If I=1, it is necessary to set an initial value $\Delta\theta_1$ of $\Delta\theta_i$ (the initial value of the gyro sensor 76). According to the second embodiment, the initial value $\Delta\theta_1$ may be set to a given value (for example, zero) or a user may input an arbitrary direction value as the initial value $\Delta\theta_1$.

Referring back to FIG. 33, at operation S504, the position-below-light-emitter-receiver calculating unit 72 determines whether the downlink transmission data from the optical beacon 90 is received. If the determination at operation S504 is affirmative, then at operation S506, the position-below-light-emitter-receiver calculating unit 72 determines whether the downlink transmission data is received from the first optical beacon. If the determination at operation S506 is affirmative, then at operation S508, the position-below-light-emitter-receiver calculating unit 72 sets the absolute position information in the downlink transmission data for an absolute position 1 and stores the absolute position information along with the relative path information when the absolute position is acquired (the relative position corresponding to the absolute position 1).

Then, the determinations at operations S502 and S504 are performed. If the determination at operation S504 is negative, the process goes to Operation S522. At operation S522, it is determined whether the correction values and the reference absolute coordinate exist. If the determination at operation S522 is negative, the process goes back to Operation S502. Then, operation s S502, S504, and S522 are repeated. After the determination at operation S504 is affirmative, the determination at operation S506 is negative (because the downlink transmission data from the second optical beacon has been received) and the process goes to Operation S510.

At operation S510, the position-below-light-emitter-receiver calculating unit 72 sets the absolute position information in the downlink transmission data for an absolute position 2 and stores the absolute position information along with the relative path information when the absolute position is acquired (the relative position corresponding to the absolute position 2).

Figure 35:
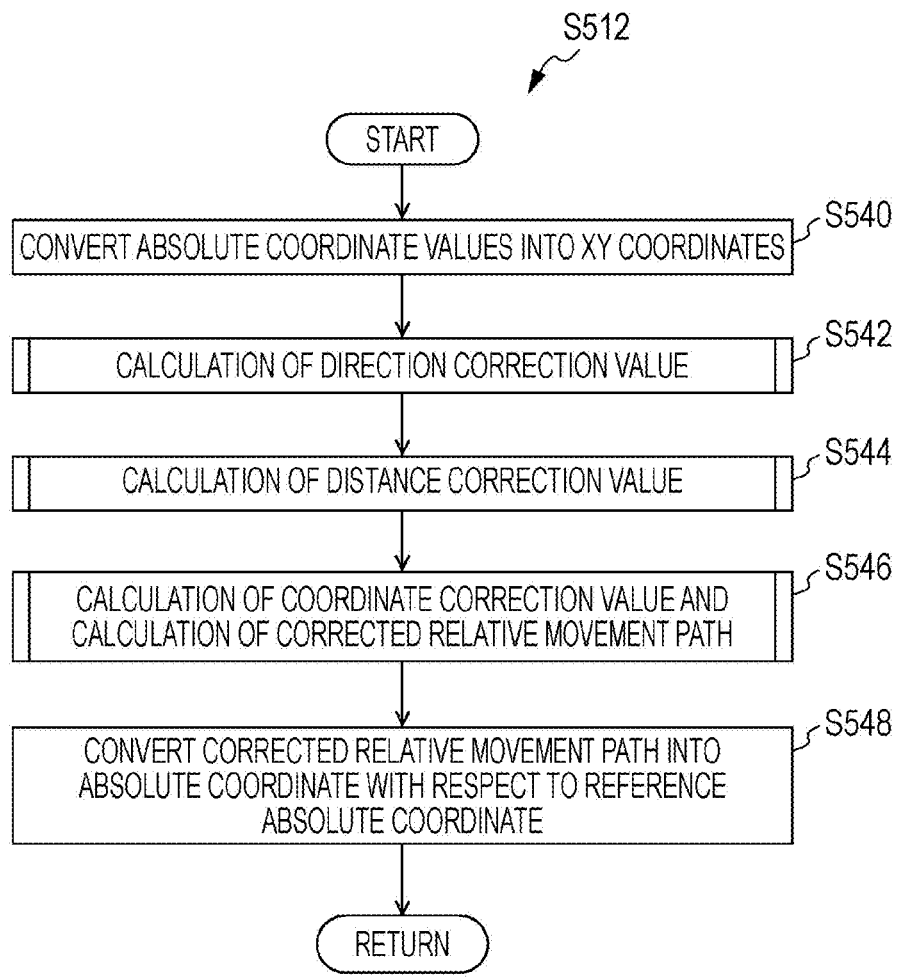
FIG. 35 is an operation chart depicting the processing at operation S512 in FIG. 33 in detail.

At operation S512, a subroutine to convert the relative path into the absolute coordinate is executed according to an operation chart in FIG. 35. In the subroutine in FIG. 35, at operation S540, the coordinate converting part 20' converts the absolute coordinates 1 and 2 into XY coordinates. In this case, for example, the coordinate of the absolute position 2 is set as the reference absolute coordinate, that is, is set to (0, 0) and the conversion into the XY coordinate is performed on the basis of the distance and the positional relationship between the absolute positions 1 and 2, as in the above first embodiment. In the conversion into the XY coordinates, it is preferred that a calculation method using the spherical trigonometry or a calculation method in which the earth is assumed as an elliptical body of revolution be adopted to calculate a distance from a longitude and latitude because the traveling distances of vehicles are normally much longer than the movement distances of persons. However, if the distance between the absolute positions 1 and 2 is short, the calculating method in which the earth is assumed as a plane may be adopted, as in the above first embodiment.

Figure 36:
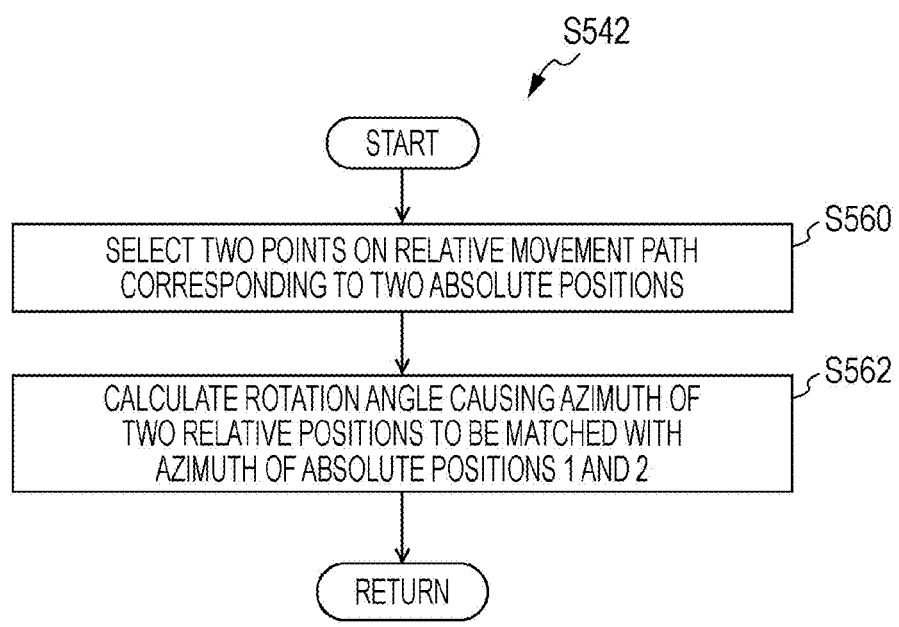
FIG. 36 is an operation chart depicting the processing at operation S542 in FIG. 35 in detail.

At operation S542, a subroutine to calculate the direction correction value is executed according to an operation chart in FIG. 36. In the subroutine in FIG. 36, at operation S560, the direction-correction-value calculator 222' selects the relative position corresponding to the absolute position 1 and the relative position corresponding to the absolute position 2. At operation S562, the direction-correction-value calculator 222' calculates the rotation angle β' causing the azimuth of the two relative positions to be matched with the azimuth of the absolute positions 1 and 2. The calculated rotation angle β' is used as the direction correction value. The correction values can be easily calculated in the second embodiment, unlike the first embodiment. This is because the accurate absolute positions can be acquired through the optical beacons.

Figure 37:
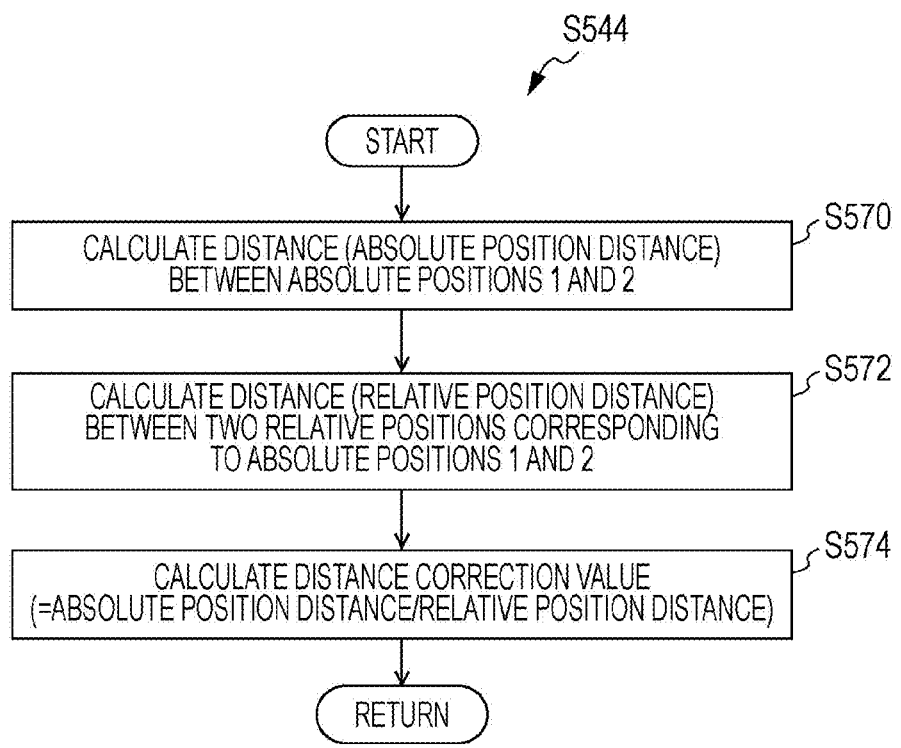
FIG. 37 is an operation chart depicting the processing at operation S544 in FIG. 35 in detail.

Referring back to FIG. 35, at operation S544, the distance-correction-value calculator 224' executes a subroutine to calculate the distance correction value according to an operation chart in FIG. 37. In the subroutine in FIG. 37, at operation S570, the distance-correction-value calculator 224' calculates the distance (absolute position distance) between the absolute positions 1 and 2.

At operation S572, the distance-correction-value calculator 224' calculates the distance (relative position distance) between the relative position corresponding to the absolute position 1 and the relative position corresponding to the absolute position 2.

At operation S574, the distance-correction-value calculator 224' calculates the distance correction value ε' according to Expression (20):

$$\epsilon' = \text{Absolute position distance/Relative position distance} \quad (20)$$

Then, the process goes back to Operation S546 in FIG. 35.

Figure 38:
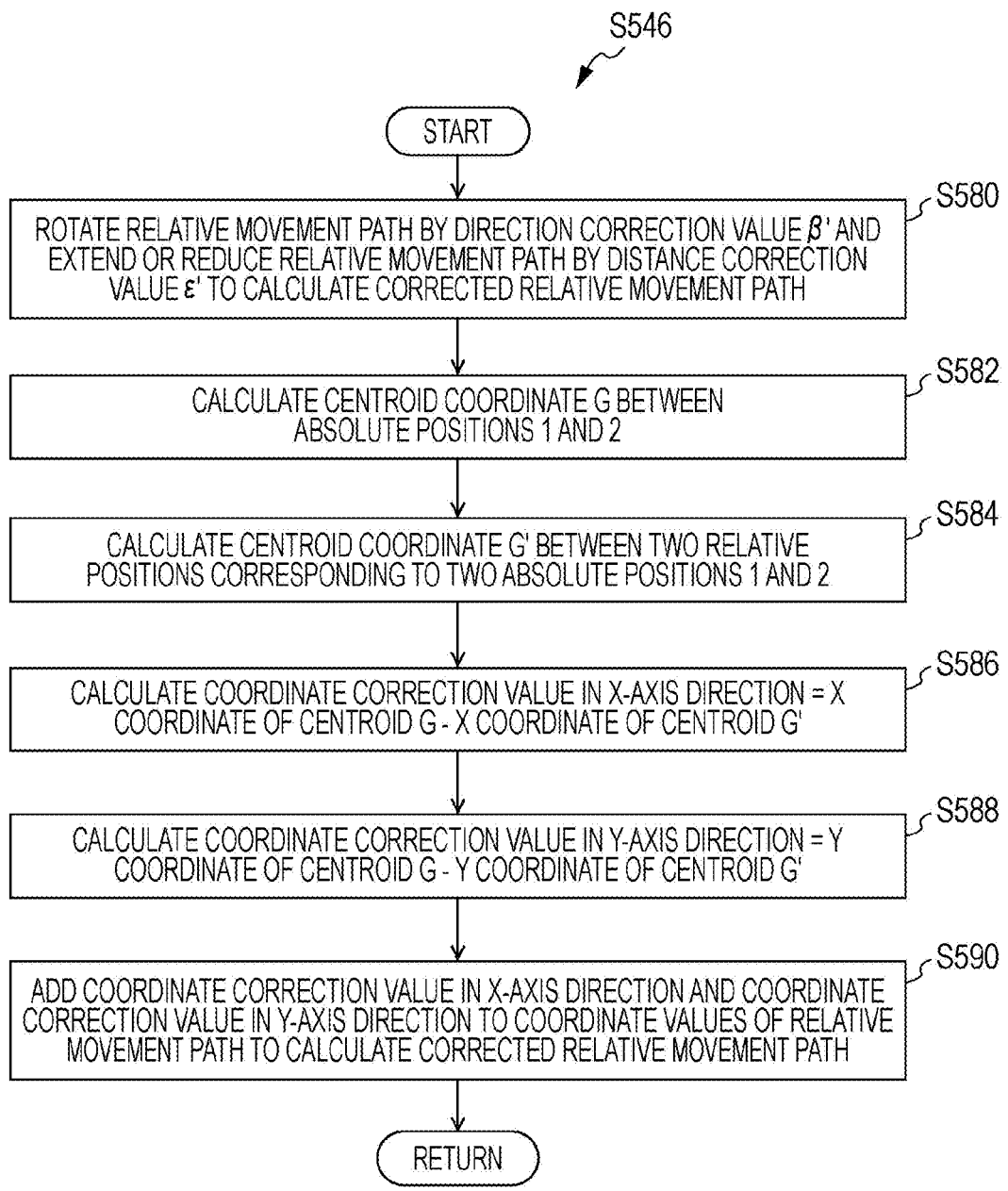
FIG. 38 is an operation chart depicting the processing at operation S546 in FIG. 35 in detail.

At operation S546, a subroutine to calculate a coordinate correction value and to calculate a corrected relative path depicted in an operation chart in FIG. 38 is executed. In the subroutine in FIG. 38, at operation S580, the coordinate-correction-value calculator 226' rotates the relative path by the direction correction value β' and extends or reduces the relative path by the distance correction value ε' to calculate a corrected relative path.

At operation S582, the coordinate-correction-value calculator 226' calculates a centroid coordinate G between the absolute positions 1 and 2. In this case, the midpoint of the segment connecting the absolute position 1 with the absolute position 2 is used as the centroid coordinate G.

At operation S584, the coordinate-correction-value calculator 226' calculates a centroid coordinate G' between the relative position corresponding to the absolute position 1 and the relative position corresponding to the absolute position 2. In this case, the midpoint of the segment connecting the two relative positions is used as the centroid coordinate G'.

At operation S586, the coordinate-correction-value calculator 226' calculates a coordinate correction value in the X axis direction according to Expression (21):

Coordinate correction value in the X axis direction=X coordinate of centroid G−X coordinate of centroid G' (21)

At operation S588, the coordinate-correction-value calculator 226' calculates a coordinate correction value in the Y axis direction according to Expression (22):

Coordinate correction value in the Y axis direction=Y coordinate of centroid G−Y coordinate of centroid G' (22)

Operations S586 and S588 may be performed in reverse.

At operation S590, the correction value applier 228' adds the coordinate correction value in the X axis direction and the coordinate correction value in the Y axis direction to the coordinate values of the relative path corrected at operation S580 to calculate the corrected relative path. Then, the process goes to Operation S548 in FIG. 35.

At operation S548, the coordinate converting part 20' converts the corrected relative path calculated at operation S590 in FIG. 38 into the absolute coordinate with respect to the absolute positions 1 and 2. For example, the calculating method using the spherical trigonometry or the calculating method in which the earth is assumed as an elliptical body of revolution described above is preferably adopted in this conversion. However, if the distance between the absolute positions is relatively short, the calculation method in which the earth is assumed as a plane may be adopted, as in the above first embodiment.

When the process in FIG. 35 (the subroutine at operation S512) is completed in the above manner, the process goes to Operation S514 in FIG. 33. At operation S514, the path-information storage 26' stores the corrected relative path converted into the absolute coordinate. At operation S516, the direction correction value β', the distance correction value ε', the coordinate correction value in the X axis direction, the coordinate correction value in the Y axis direction, and the reference absolute coordinate (the value of the absolute position 2 here) are stored in the correction-value storage 24'.

At operation S518, the absolute-position acquiring part 18' replaces the value of the absolute position 1 with the value of the absolute position 2 and clears the absolute position 2. At operation S520, the relative-path calculating part 16' clears all the relative path information other than the relative position information corresponding to the current absolute position 1 (the previous absolute position 2) and the process goes back to Operation S502.

Then, at operation S502, the subroutine to create the relative path is executed. At operation S504, it is determined whether the downlink transmission data from the optical beacon is received. If the determination at operation S504 is negative, the process goes to Operation S522. At operation S522, it is determined whether the correction values and the reference absolute coordinate exist. Since the correction values and the reference absolute coordinate have been stored in the correction-value storage 24' at operation S516 at this time, the determination at operation S522 is affirmative. Then, at operation S524, the correction value applier 228' and the coordinate converting part 20' correct the relative path with the correction values and the reference absolute coordinate to convert the relative path into the absolute coordinate. At operation S526, the path-information storage 26' stores the relative path converted into the absolute coordinate (the absolute movement path) and the process goes back to Operation S502.

Subsequently, operations S510 to S520 are performed upon reception of the downlink transmission data from the optical beacon 90 to calculate new correction values and a new reference absolute coordinate. Before another downlink transmission data is received after the calculation of the new correction values and reference absolute coordinate, the correction of the relative path and the coordinate conversion are performed by using these correction values and reference absolute coordinate.

According to the second embodiment, the path information (the absolute movement path) stored in the path-information storage 26' in the above manner is appropriately displayed on the screen of a car navigation system mounted in the vehicle.

As described above in detail, according to the second embodiment, the relative path of the vehicle is calculated from the traveling direction of the vehicle detected by the in-vehicle apparatus 60 with the gyro sensor 76 and the traveling distance of the vehicle detected by the in-vehicle apparatus 60 with the vehicle-speed pulse sensor 78. In addition, the absolute position coordinate of the optical beacon is received as the downlink data each time the vehicle passes below the optical beacon 90 and, when two absolute positions are accumulated, the correction values (β', ε', and the coordinate correction values) are calculated from the relationship between the two absolute positions and the two relative positions at the time when the absolute positions are measured. The correction values and the relative path are used to calculate the absolute movement path of the vehicle indicated by the absolute coordinate. Since the correction values causing the relative path to be close to the actual movement path (the absolute movement path) can be calculated from the relationship between the two absolute positions and the two relative positions corresponding to the absolute positions, it is possible to accurately calculate the absolute movement path of the user regardless of the initial value of the gyro sensor 76.

According to the second embodiment, since the absolute movement path of the user can be accurately calculated, the determination of whether the vehicle is on a right-turn lane, whether the vehicle enters an intersection, where the vehicle is located in the intersection, etc. can be based on the absolute movement path. Accordingly, it is possible to further improve the advanced safety service by using the determined information.

According to the second embodiment, since the absolute position information is acquired each time the position information (the downlink transmission data) is received from the external transmitter (the optical beacon 90), it is possible to calculate the correction values and the reference absolute coordinate at appropriate timing.

According to the second embodiment, since the correction of the relative path and the coordinate conversion are performed by using the correction values and reference absolute coordinate that have been previously calculated before the downlink transmission data is received from the second optical beacon, it is possible to, for example, calculate the absolute position and display the path information (the absolute movement path) substantially in real time.

Although the correction values and the reference absolute coordinate are re-calculated when two pieces of downlink transmission data from the optical beacon 90 are accumulated in the second embodiment, the time when the correction values and the reference absolute coordinate are re-calculated is not restricted to the above one. For example, when N-number (N≥2) absolute positions are accumulated, the correction values and the reference absolute coordinate may be re-calculated by using two absolute positions, among the N-number absolute positions, and the two relative positions corresponding to the absolute positions.

Although the in-vehicle apparatus 60 calculates the path information about the vehicle (the absolute movement path of the vehicle) by using the information from the optical beacon 90 in the second embodiment, the calculation method of the path information about the vehicle is not restricted to the above one. For example, the second embodiment is also applicable to a system of calculating the path information about the user (the absolute movement path of the user) having a radio frequency identification (RFID) code on the basis of information supplied from an apparatus supplying information to certain terminals (for example, an apparatus transmitting information to the RFID).

Although the correction values are calculated mainly using the two points having the largest distance therebetween, among the N-number absolute positions, in the above embodiments, other two points may be used instead of using the two points having the largest distance therebetween.

The absolute-movement-path calculating apparatus according to the above embodiments may be composed of a combination of the multiple parts (corresponding to the components in FIG. 1 and the components in FIG. 32). Alternatively, the parts may compose a computer system including a central processing unit (CPU), a read only memory (ROM), a random access memory (RAM), etc. and the functions of the parts may be realized by programs included in the computer system.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An absolute-movement-path calculating apparatus comprising:
    a direction acquiring part detecting a movement direction of a terminal by referring a standard axis defined for a terminal in advance at a given timing;
    a movement-distance calculating part calculating a movement distance of the terminal at the given timing;
    a relative-movement-path calculating part calculating a relative movement path, based on both the detection result in the direction acquiring part and the detection result in the movement-distance calculating part, and storing the relative movement path;
    an absolute-position acquiring part acquiring an absolute position of the terminal, which corresponds to a start position of the calculated relative movement path and which is indicated by an absolute coordinate represented by a longitude and latitude, and storing the absolute position; and
    an absolute-movement-path calculating part calculating, each time the absolute positions of a given number are stored, a correction value from the relationship between at least two absolute positions among the absolute positions of the given number, and the relative positions corresponding to the absolute positions and calculating an absolute movement path of the terminal indicated by the absolute coordinate from the correction value and the relative movement path.

2. The absolute-movement-path calculating apparatus according to claim 1, wherein
    the movement-distance calculating part detects a movement distance of the terminal at the given timing from a step length of a user carrying the terminal, which step length of the user is set in advance, and a number of steps of the user which is detected from an acceleration of the terminal.

3. The absolute-movement-path calculating apparatus according to claim 1, wherein
    the time when the absolute-position acquiring part acquires the absolute position corresponds to at least one time among times including a time when the movement distance of the terminal reaches a given value, a time when the amount of variation in the direction detected by referring the standard axis defined for the terminal in advance reaches a given value, and a time when position information is received from an external transmitter.

4. The absolute-movement-path calculating apparatus according to claim 1, wherein
    after the correction value is calculated, a temporary absolute position path is calculated from the relative position calculated after the calculation of the correction value and the correction value and, when a new correction value is calculated, a true absolute position path is calculated from the relative position used for the calculation of the temporary absolute position path and the new correction value.

5. The absolute-movement-path calculating apparatus according to claim 1, wherein
    the absolute-movement-path calculating part calculates a plurality of correction values including a direction correction value used for correcting the direction of the relative movement path, a distance correction value used for correcting the movement distance, and a coordinate correction value used for correcting the coordinate value.

6. The absolute-movement-path calculating apparatus according to claim 2, wherein
the absolute-movement-path calculating part calculates a plurality of correction values including a direction correction value used for correcting the direction of the relative movement path, a distance correction value used for correcting the movement distance, and a coordinate correction value used for correcting the coordinate value.

7. The absolute-movement-path calculating apparatus according to claim 5, wherein
the absolute-movement-path calculating part calculates an angle of a straight line resulting from connection of two absolute positions among the absolute positions of the given number and calculates an angle of the two relative positions corresponding to the two absolute positions to set a difference between the two angles as the direction correction value.

8. The absolute-movement-path calculating apparatus according to claim 6, wherein
the absolute-movement-path calculating part calculates an angle of a straight line resulting from connection of two absolute positions among the absolute positions of the given number and calculates an angle of the two relative positions corresponding to the two absolute positions to set a difference between the two angles as the direction correction value.

9. The absolute-movement-path calculating apparatus according to claim 5, wherein
the absolute-movement-path calculating part calculates an angle of a straight line resulting from connection of two absolute positions among the absolute positions of the given number, calculates an angle of the two relative positions corresponding to the two absolute positions, rotates the relative movement path so that the angle of the two relative positions is within an absolute-position azimuth range calculated from the angle of the straight line resulting from connection of the two absolute positions and a measurement error in the absolute-position acquiring part, and calculates the value of a rotation angle causing the sum of the angles between the sides of a graphic resulting from connection of the absolute positions of the given number and the corresponding sides of a graphic resulting from connection of the relative positions corresponding to the absolute positions of the given number to be minimized to set the value of the rotation angle as the direction correction value when the absolute position acquired by the absolute-position acquiring part includes an error.

10. The absolute-movement-path calculating apparatus according to claim 6, wherein
the absolute-movement-path calculating part calculates an angle of a straight line resulting from connection of two absolute positions among the absolute positions of the given number, calculates an angle of the two relative positions corresponding to the two absolute positions, rotates the relative movement path so that the angle of the two relative positions is within an absolute-position azimuth range calculated from the angle of the straight line resulting from connection of the two absolute positions and a measurement error in the absolute-position acquiring part, and calculates the value of a rotation angle causing the sum of the angles between the sides of a graphic resulting from connection of the absolute positions of the given number and the corresponding sides of a graphic resulting from connection of the relative positions corresponding to the absolute positions of the given number to be minimized to set the value of the rotation angle as the direction correction value when the absolute position acquired by the absolute-position acquiring part includes an error.

11. The absolute-movement-path calculating apparatus according to claim 5, wherein
the absolute-movement-path calculating part acquires an absolute position distance, which is the distance between two absolute positions among the absolute positions of the given number, and acquires a relative position distance, which is the distance between the two relative positions corresponding to the two absolute positions, to set a ratio of the absolute position distance to the relative position distance as the distance correction value.

12. The absolute-movement-path calculating apparatus according to claim 6, wherein
the absolute-movement-path calculating part acquires an absolute position distance, which is the distance between two absolute positions among the absolute positions of the given number, and acquires a relative position distance, which is the distance between the two relative positions corresponding to the two absolute positions, to set a ratio of the absolute position distance to the relative position distance as the distance correction value.

13. The absolute-movement-path calculating apparatus according to claim 5, wherein
if the absolute positions acquired by the absolute-position acquiring part includes an error, the absolute-movement-path calculating part determines whether the distance between the two relative positions corresponding to two absolute positions among the absolute positions of the given number is within an absolute-position-distance range calculated from the distance between the two absolute positions and the measurement error in the absolute-position acquiring part to set a ratio of a minimum value of the absolute-position-distance range to the relative position distance as the distance correction value if the determination shows that the relative position distance is smaller than the minimum value of the absolute-position-distance range, set a ratio of a maximum value of the absolute-position-distance range to the relative position distance as the distance correction value if the determination shows that the relative position distance is larger than the maximum value of the absolute-position-distance range, and set the distance correction value to one if the determination shows that the relative position distance is smaller than the maximum value of the absolute-position-distance range and larger than the minimum value thereof.

14. The absolute-movement-path calculating apparatus according to claim 6, wherein
if the absolute positions acquired by the absolute-position part includes an error, the absolute-movement-path calculating part rotates the relative movement path by the direction correction value and, in a state in which the centroid of a graphic resulting from connection of the absolute positions of the given number is matched with the centroid of a graphic resulting from connection of the relative positions corresponding to the absolute positions of the given number, extends or reduces the graphic resulting from connection of the relative positions to set a scale factor of extension and reduction causing the sum of the distances between the absolute positions of the given number and the relative positions corresponding to the absolute positions to be minimized as the distance correction value.

15. The absolute-movement-path calculating apparatus according to claim 5, wherein
the absolute-movement-path calculating part sets an amount of movement necessary to match the centroid of a graphic resulting from connection of the absolute positions of the given number with the centroid of a graphic resulting from connection of the relative positions corresponding to the absolute positions in a state in which the relative movement path is rotated by the direction correction value and is extended or reduced by the distance correction value as the coordinate correction value.

16. The absolute-movement-path calculating apparatus according to claim 5, wherein
if the absolute positions acquired by the absolute-position acquiring part includes an error, the absolute-movement-path calculating part sets the sum of an amount of movement and a minute amount of movement of the relative movement path as the coordinate correction value, the amount of movement being necessary to match the centroid of a graphic resulting from connection of the absolute positions of the given number with the centroid of a graphic resulting from connection of the relative positions corresponding to the absolute positions in a state in which the relative movement path is rotated by the direction correction value and is extended or reduced by the distance correction value, the minute amount of movement of the relative movement path being necessary to minimize the sum of the distances between the absolute positions and the relative positions corresponding to the absolute positions in the state in which the centroids are matched with each other.

17. A method for causing a terminal to function as an absolute movement path apparatus, the method causing a computer to execute the operations of:
detecting a movement direction of the terminal detected by referring a standard axis defined for the terminal in advance at given timing by a direction acquiring part of the terminal;
detecting a movement distance of the terminal at the given timing by a movement-distance calculating part of the terminal;
calculating a relative movement path by using the detection result in the direction acquiring operation and the detection result in the movement-distance detecting operation and storing the relative movement path by a relative-movement-path calculating part of the terminal;
acquiring an absolute position of the terminal, which corresponds to a start position of the calculated relative movement path and which is indicated by an absolute coordinate represented by a longitude and latitude, and storing the absolute position by an absolute-position acquiring part of the terminal; and
calculating, each time the absolute positions of a given number are stored, a correction value from the relationship between at least two absolute positions, among the absolute positions of the given number, and the relative positions corresponding to the absolute positions and calculating an absolute movement path of the terminal indicated by the absolute coordinate from the correction value and the relative movement path by an absolute-movement-path calculating part of the terminal.

18. The method according to claim 17, wherein
a plurality of correction values are calculated in the absolute-movement-path calculating operation by the absolute-movement-path calculating part of the terminal, the correction values including a direction correction value used for correcting the direction of the relative movement path, a distance correction value used for correcting the movement distance, and a coordinate correction value used for correcting the coordinate value.

19. A computer-readable recording medium storing a program for causing a computer to function as an absolute-movement-path calculating apparatus, the program causing the computer to execute the operations of:
detecting a movement of a terminal direction by referring the standard axis defined for a terminal in advance at given timing;
detecting a movement distance of the terminal at the given timing;
calculating a relative movement path by using the detection result in the direction acquiring operation and the detection result by the movement-distance detecting operation and storing the relative movement path;
acquiring an absolute position of the terminal, which corresponds to a start position of the calculated relative movement path and which is indicated by an absolute coordinate represented by a longitude and latitude, and storing the absolute position; and
calculating, each time the absolute positions of a given number are stored, a correction value from the relationship between at least two absolute positions, among the absolute positions of the given number, and the relative positions corresponding to the absolute positions and calculating an absolute movement path of the terminal indicated by the absolute coordinate from the correction value and the relative movement path.

20. The computer-readable recording medium storing the program according to claim 19,
wherein a plurality of correction values are calculated in the absolute-movement-path calculating operation, the correction values including a direction correction value used for correcting the direction of the relative movement path, a distance correction value used for correcting the movement distance, and a coordinate correction value used for correcting the coordinate value.

* * * * *